(12) United States Patent
Tinaphong

(10) Patent No.: US 8,362,745 B2
(45) Date of Patent: Jan. 29, 2013

(54) METHOD AND APPARATUS FOR HARVESTING ENERGY

(75) Inventor: Prapan Paul Tinaphong, Westfield, IN (US)

(73) Assignee: Audiovox Corporation, Hauppauge, NY (US)

( * ) Notice: Subject to any disclaimer, the term of this patent is extended or adjusted under 35 U.S.C. 154(b) by 27 days.

(21) Appl. No.: 12/930,421

(22) Filed: Jan. 6, 2011

(65) Prior Publication Data

US 2011/0175461 A1    Jul. 21, 2011

Related U.S. Application Data

(60) Provisional application No. 61/335,459, filed on Jan. 7, 2010, provisional application No. 61/402,481, filed on Aug. 31, 2010, provisional application No. 61/404,290, filed on Sep. 30, 2010.

(51) Int. Cl.
     *H01M 10/46*      (2006.01)
     *H01M 10/44*      (2006.01)
     *H02J 7/00*      (2006.01)

(52) U.S. Cl. ........................................ 320/108; 320/101

(58) Field of Classification Search .................... 320/108
See application file for complete search history.

(56) References Cited

U.S. PATENT DOCUMENTS

| | | | |
|---|---|---|---|
| 6,127,799 A | 10/2000 | Krishnan | 320/104 |
| 6,289,237 B1 | 9/2001 | Mickle et al. | 600/509 |
| 6,615,074 B2 | 9/2003 | Mickle et al. | 600/509 |
| 6,856,291 B2 | 2/2005 | Mickle et al. | 343/701 |
| 6,882,128 B1 | 4/2005 | Rahmel et al. | 320/101 |
| 7,057,514 B2 | 6/2006 | Mickle et al. | 340/572.7 |
| 7,084,605 B2 | 8/2006 | Mickle et al. | 320/101 |
| 7,283,053 B2 | 10/2007 | Mickle et al. | 340/572.2 |
| 7,373,133 B2 | 5/2008 | Mickle et al. | 455/343.1 |
| 7,383,064 B2 | 6/2008 | Mickle et al. | 455/573 |
| 7,400,253 B2 | 7/2008 | Cohen | 340/572.1 |
| 7,403,803 B2 | 7/2008 | Mickle et al. | 455/573 |
| 7,440,780 B2 | 10/2008 | Mickle et al. | 455/573 |
| 7,528,698 B2 | 5/2009 | Mickle et al. | 340/10.34 |
| 7,565,968 B2 * | 7/2009 | Lindley | 206/223 |
| 7,567,824 B2 | 7/2009 | Mickle et al. | 455/573 |
| 2003/0199778 A1 | 10/2003 | Mickle et al. | 600/509 |
| 2004/0085247 A1 | 5/2004 | Mickle et al. | 343/701 |
| 2004/0259604 A1 | 12/2004 | Mickle et al. | 455/572 |
| 2005/0104553 A1 | 5/2005 | Mickle et al. | 320/101 |
| 2005/0210340 A1 | 9/2005 | Townsend et al. | 714/701 |
| 2006/0058076 A1 | 3/2006 | Mickle et al. | 455/574 |
| 2006/0094425 A1 | 5/2006 | Mickle et al. | 455/434 |
| 2006/0136007 A1 | 6/2006 | Mickle et al. | 607/45 |
| 2006/0168758 A1 | 8/2006 | Chiang et al. | 16/342 |
| 2006/0281435 A1 | 12/2006 | Shearer et al. | 455/343.1 |
| 2007/0109121 A1 | 5/2007 | Cohen | 340/539.26 |

(Continued)

OTHER PUBLICATIONS

Notification of Transmittal of the International Search Report and the Written Opinion of the International Searching Authority, or the Declaration (in English) dated Mar. 3, 2011, International Search Report (in English) dated Mar. 3, 2011 and Written Opinion of the International Searching Authority (in English) dated Mar. 3, 2011.

*Primary Examiner* — Samuel Berhanu
(74) *Attorney, Agent, or Firm* — Gerald T. Bodner

(57) ABSTRACT

An energy harvesting circuit includes one or more broadband or narrow band antennas to detect WIFI (wireless fidelity) or other RF (radio frequency) signals. The signals are rectified and voltage multiplied, and the resultant DC voltage is provided to a power management circuit. The output of the power management circuit charges a lithium battery or other storage device within the energy harvesting circuit. The energy stored in the battery or storage device is provided through a DC/DC converter circuit to a USB output connector to power or recharge the batteries of an external electronic device connected to the USB output connector of the energy harvesting circuit.

59 Claims, 11 Drawing Sheets

U.S. PATENT DOCUMENTS

| | | | |
|---|---|---|---|
| 2007/0142872 A1 | 6/2007 | Mickle et al. | 607/45 |
| 2007/0173214 A1 | 7/2007 | Mickle et al. | 455/127.1 |
| 2007/0191908 A1 | 8/2007 | Jacob et al. | 607/48 |
| 2008/0174436 A1 | 7/2008 | Landt et al. | 340/572.7 |
| 2009/0098915 A1 | 4/2009 | Mickle et al. | 455/573 |
| 2009/0105782 A1 | 4/2009 | Mickle et al. | 607/45 |
| 2009/0200985 A1 | 8/2009 | Zane et al. | 320/108 |
| 2009/0207000 A1 | 8/2009 | Mickle et al. | 340/10.34 |
| 2009/0284245 A1 | 11/2009 | Kirby et al. | 323/318 |
| 2009/0303076 A1 | 12/2009 | Setiadi et al. | 340/870.01 |
| 2009/0310393 A1 | 12/2009 | Mickle et al. | 363/126 |
| 2010/0073188 A1 | 3/2010 | Mickle et al. | 340/8.1 |

\* cited by examiner

METHOD AND APPARATUS FOR HARVESTING ENERGY

CROSS-REFERENCE TO RELATED APPLICATIONS

This application is related to U.S. Provisional Application Ser. No. 61/335,459, filed on Jan. 7, 2010, and entitled "Method and Apparatus for Harvesting Energy from WIFI Signals", U.S. Provisional Application Ser. No. 61/402,481, filed on Aug. 31, 2010, and entitled "Method and Apparatus for Harvesting Energy", and U.S. Provisional Application Ser. No. 61/404,290, filed on Sep. 30, 2010, and entitled "Method and Apparatus for Harvesting Energy", the disclosures of which are incorporated herein by reference and on which by priority is hereby claimed.

BACKGROUND OF THE INVENTION

1. Field of the Invention

The present invention relates to energy conservation methods and devices, and more particularly relates to devices which can harvest energy.

2. Description of the Prior Art

Many devices have been proposed or implemented which harvest energy from different types of naturally-occurring energy sources. These energy sources include solar, wind, tide, current and wave power, the energy of which is converted by such devices into electrical power to supplement or replace electrical power provided by a power company. Except for solar cells powering hand held calculators and other small electronic devices, most energy harvesting apparatus are relatively large, expensive and inefficient. To the knowledge of the inventor, there are no RF (radio frequency) commercially available devices which harvest energy from WIFI (wireless fidelity), WiMax, Satellite Radio, Cellular Phone (850 MHz to 900 MHz and 1.8 GHz-1.9 GHz), or any 2.4 GHz and UHF TV signal sources to power or recharge the batteries of small electronic devices, such as cellular phones, personal digital assistants (PDAs), MP3 players or the like.

OBJECTS AND SUMMARY OF THE INVENTION

It is an object of the present invention to provide a device which harvests energy from WIFI, WiMax, Satellite Radio, Cellular Phone (850 MHz to 900 MHz and 1.8 GHz-1.9 GHz), and any 2.4 GHz and UHF TV signals or any signal from outdoor antenna or CATV feed through any "F" type connectors at consumers' homes.

It is another object of the present invention to provide a method and device for harvesting energy from two or more alternative sources of energy such as solar and vibration from a microphone for powering or recharging the batteries of an electronic device.

It is yet another object of the present invention to provide an energy harvesting device which stores energy for later use to power an electronic device connected thereto.

It is a further object of the present invention to provide a device for harvesting energy from both WIFI or other RF signals and solar power to power an external electronic device connected thereto.

It is yet a further object of the present invention to provide apparatus for harvesting energy from WIFI or other RF signals which converts WIFI or RF signals received thereby into a DC (direct current) voltage, the energy from which is stored in a storage device within the apparatus, and which further has the capability of being connectable to a source of electrical power for storing energy therefrom in the storage device for later consumption by a user to power an external electronic device connected to the energy harvesting apparatus.

In accordance with one form of the present invention, a device for harvesting energy from WIFI or other RF signals includes one or more broadband antennas which are respectively connected to one or more voltage multiplier/rectifier circuits. Each voltage multiplier/rectifier circuit converts the WIFI or RF signals received by the respective antenna coupled thereto into a DC voltage, having an amplitude multiplied a number of times, such as by a factor of 4, 6 or 8. The DC voltage output signals from the voltage multiplier/rectifier circuits are added in series and in the same polarity (i.e., the voltages are "stacked") or in parallel to provide a combined, detected DC voltage signal, which is provided to a temporary storage device, such as a capacitor.

When the voltage on the capacitor reaches a predetermined level, a watchdog monitor circuit effectively connects the temporary storage capacitor to the input of a power management circuit. The power management circuit includes a charge pump circuit which increases the voltage on the input of the power management circuit to a higher, more useable voltage on its output for charging a storage device, such as a lithium battery (for example, lithium polymer, lithium-ion or any lithium chemical type). Accordingly, the output voltage of the power management circuit is at a predetermined voltage level to charge the lithium battery or other storage device.

In a preferred form of the present invention, the device further includes a solar cell which converts solar energy from light impinging thereon to an electrical voltage, which is also filtered and provided to a second power management circuit. The output of this second power management circuit also provides a voltage at a predetermined level to the lithium battery or other storage device in response to the voltage from the solar cell resulting from the light impinging thereon.

The output of the lithium battery or storage device is connected to the input of a DC/DC boost converter circuit, which provides preferably a 5 volt DC voltage on a USB output connector to which is connectable the external electronic device to be powered thereby or whose battery is to be charged.

In a preferred form of the invention, the energy harvesting device of the present invention may include an input connector for receiving a charging voltage from an external power source, such as another electronic device, or a power transformer for such device which is connected to a cigarette lighter of an automobile, or to an AC/DC adapter for connection to a 110 volt AC wall power receptacle, for example. The power signal from this external electrical power source is provided to the lithium battery or other storage device internal to the energy harvesting circuit so that the lithium battery or storage device may be charged thereby.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
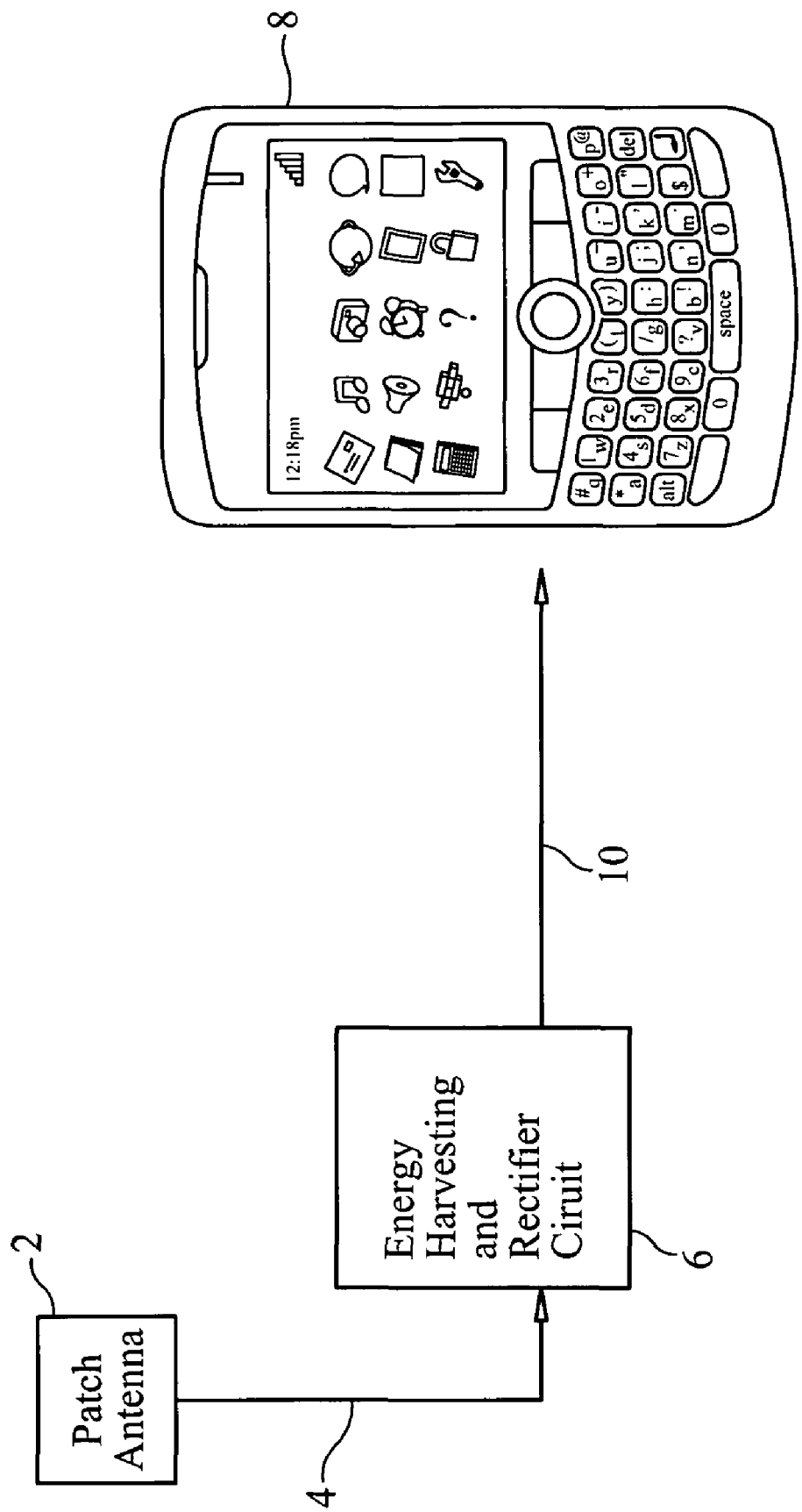
FIG. 1 is a block diagram of a circuit for harvesting energy transmitted from an RF (radio frequency) source to charge and/or power an electronic device, such as a cellular telephone or a PDA or a Blackberry™ device, formed in accordance with the present invention.

The present invention is designed to receive radio frequency signals from any WIFI 2.4 to 2.5 GHz source, WiMax, Satellite Radio, Cellular Phone (850 MHz to 900 MHz and 1.8 GHz-1.9 GHz), and UHF TV signals or CATV signals and convert the received radio frequency signal into another form of energy, such as a DC voltage. Even more preferably, the energy harvesting device of the present invention is capable of receiving RF signals from about 500 MHz to about 2.5 GHz, and convert the received signals into electrical energy. The same circuit configuration can also be designed and extended to convert RF signals in VHF, FM and UHF frequencies (such as signals from CATV) into DC electrical energy. This energy is utilized to recharge a battery inside any cell phone through a USB connector. The invention is designed to use WIFI signals, in particular, for energy harvesting because many WIFI signal transmitters are provided and are available in public places, such as airport terminals, coffee shops, fast food restaurants, etc., where an AC power outlet may not be easily accessible for a user to charge or power an electronic device by connecting it to the outlet.

There are many types of energy harvesting devices or systems that are known, such as solar cell, windmill, water pressure to provide movement in power generators, FM radio signals to charge small toys or flying devices (for example, spy monitor devices) inductive chargers, and the like. However, no one heretofore has taken advantage of the many WIFI signals, cell phone signals, Satellite Radio or UHF TV signals that are mostly available in public places, and the energy from those transmitted signals is wasted and not utilized. Such WIFI signals, Satellite Radio, UHF TV signals or cell phone signals are broadcast 24 hours a day, every day.

Most people think that the energy from WIFI or other high frequency radio signals is very minute and cannot be used, but the inventor has found otherwise. Generally, the present invention is directed to harvesting the WIFI, UHF TV, Satellite Radio or cell phone signals and converting the electromagnetic energy in the signals to a DC voltage, and providing a "top charge" to charge the batteries of an external electronic device connected thereto, or to continuously power an internal battery within the energy harvesting device until its storage capacity is full, and that battery energy may be reused when needed to power an electronic device, such as a cellular phone, PDA, MP3 player, camera or other electronic device connected thereto.

The present invention utilizes WIFI or cell phone signals that are available and easy to find in any public place or in a consumer's home almost anywhere in the world. There are many high powered WIFI broadcasting stations whose transmitted signals create a WIFI hotspot, and also WIMAX signals to be implemented at some future time are projected to be rather strong signals that have a 32 mile radial range, and the energy from these signals may also be harvested.

Provided above is a general description of the purpose and implementation of the energy harvesting method and apparatus of the present invention. Now, a detailed description of preferred forms of the present invention is provided.

A block diagram of a circuit for harvesting energy transmitted from an RF (radio frequency) source is shown in FIG. 1 of the drawings. An antenna 2, such as patch antenna, receives an RF signal, such as a WIFI signal transmitted in public places, such as airport terminals, coffee shops, fast food restaurants and the like, and converts the RF signal to an electrical signal. This electrical signal is provided via a transmission line or signal cable 4 to a circuit 6 which rectifies and harvests the energy of the transmitted RF signal. This circuit 6 converts the RF electrical signal from the antenna 2 to a DC signal of sufficient magnitude to charge and/or power an electronic device 8, such as a cellular telephone, a PDA or a Blackberry™ device connected to the energy harvesting and rectifier circuit 6 by a USB cable 10 or the like.

Figure 2:
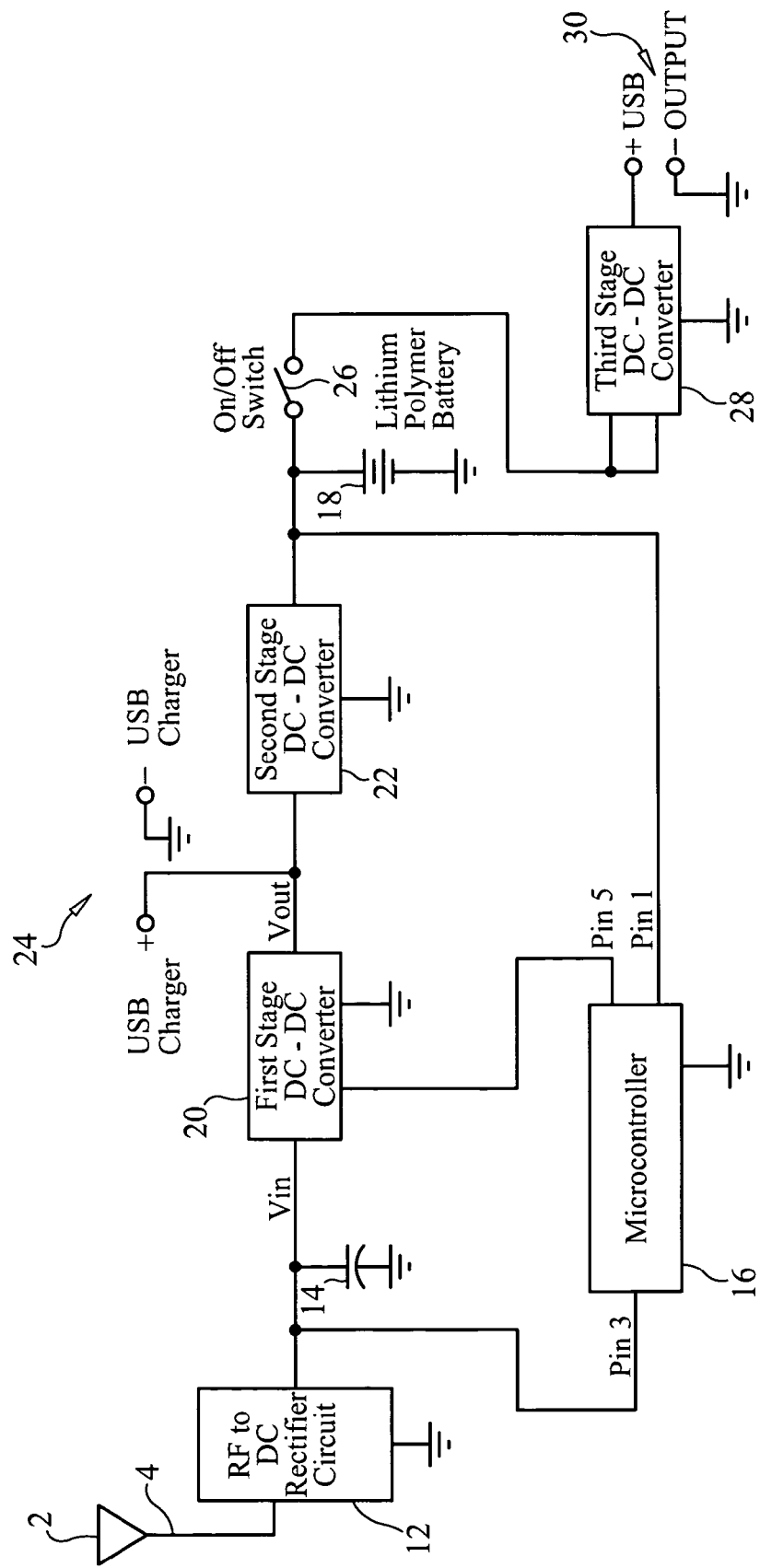
FIG. 2 is a schematic diagram of a first preferred form of an electrical circuit constructed in accordance with the present invention for harvesting energy from WIFI signals.

FIG. 2 is a schematic diagram of a first preferred form of an electrical circuit constructed in accordance with present invention for harvesting energy from WIFI or other RF signals. The energy harvesting circuit, in accordance with this first embodiment, includes an antenna 2 which receives RF signals, such as WIFI signals, and converts the RF signals to an electrical signal which is provided by a transmission line or cable 4 to the input of an RF-to-DC rectifier circuit 12. The rectifier circuit 12 converts the RF signal to a DC (direct current) signal on its output. This DC signal is provided to a first storage device 14, which is preferably a 2F (farad), 2.5 volt supercapacitor. The first storage device 14 stores and accumulates charge thereon from the rectified (DC) signal outputted by the rectifier circuit 12.

The DC signal outputted by the rectifier circuit 12 is also provided to the input (Pin 3) of a flash-based CMOS microcontroller 16 preferably having Part No. 12F683-0847 manufactured by Microchip Technology Inc. of Chandler, Ariz. The microcontroller 16 is used as a charge circuit control to prevent a lithium battery used as a second storage device 18 in the energy harvesting circuit from overcharging.

The voltage on the supercapacitor 14 is also provided to the input of a first stage DC-to-DC converter circuit 20, which acts as a charge pump, or stated another way, a step up voltage regulator and battery management circuit. Preferably, the first stage DC-to-DC converter circuit 20 is Part No. MAX1672 manufactured by Maxim Integrated Products of Sunnyvale, Calif.

When the voltage on the supercapacitor 14 reaches a certain level, such as about 1.5 volts, which is provided to the input of the microcontroller 16, the microcontroller 16 generates a pulsed signal on its output (Pin 5), which is provided to the enable input of the first stage DC-to-DC converter circuit 20 to cause the converter circuit 20, acting as a charge pump, to increase the voltage on its input from about 1.5 volts to about 4.5 volts on its output. If the voltage on the supercapacitor 14 is below a predetermined level, such as 1.5 volts, the microcontroller 16 does not provide a pulsed signal to the enable input of the first stage DC-to-DC converter circuit 20 to effectively cause the converter circuit 20 from operating, so as not to deplete charge on the supercapacitor 14 if the supercapacitor is insufficiently charged.

The output of the first stage DC-to-DC converter circuit 20 is provided to the input of a second stage DC-to-DC converter circuit 22, preferably being the same integrated circuit as the first stage DC-to-DC converter circuit 20 and having Part No. MAX1672. Again, the preferred voltage on the output of the first stage DC-to-DC converter circuit 20 is about 4.5 volts.

As can be seen from FIG. 2, the energy harvesting circuit also includes a USB charger port or connector 24 for providing a connection to an external source of voltage (preferably, about 5 volts DC), to charge the internal second storage device 18, which as will be explained is preferably a lithium polymer battery, using a lap top computer or other device connectable to the USB charger connector 24. The USB charger connector 24 has its +5 volt input pin connected to the connection between the output of the first stage DC-to-DC converter circuit 20 and the input of the second stage DC-to-DC converter circuit 22.

The second stage DC-to-DC converter circuit 22 acts as a low drop out, step down voltage converter/regulator to convert the 4.5 volts from the first stage DC-to-DC converter circuit 20 (or the 5 volt DC signal provided on the USB charger connector 24 from an external source) to a 3.7 volt DC signal on the output of the second DC-to-DC converter circuit 22. This output voltage of the second stage DC-to-DC converter circuit 22 is provided to the positive side of a lithium polymer battery 18 forming part of the energy harvesting circuit, the negative side of the battery being preferably grounded. Preferably, the lithium polymer battery is a 3.7 volt, 1.5 amp battery which is used as a second storage device 18 which is charged by the rectified and DC-converted voltage generated by the energy harvesting circuit from the RF signal received by the antenna 2, or by an external DC power source connected to the USB charger connector 24.

The voltage on the lithium polymer battery 18 is monitored so as not to exceed approximately 3.7 volts. The positive side of the lithium polymer battery 18 is connected to a feedback input (Pin 1) on the microcontroller 16 in order to limit the voltage generated by the energy harvesting circuit provided to the lithium polymer battery 18 and to an external electronic device 8 connected to the energy harvesting circuit. When the voltage on the feedback input of the microcontroller 16 reaches a predetermined threshold voltage, such as 3.7 volts, the microcontroller 16 ceases providing a pulsed signal on its output (Pin 5) connected to the enable input on the first stage DC-to-DC converter circuit 20 so as to prevent the first stage DC-to-DC converter circuit 20 from operating as a charge pump beyond a predetermined voltage conversion limit. When the voltage on the lithium polymer battery 18 falls to below the predetermined threshold voltage, which is provided to the feedback input of the microcontroller 16, the microcontroller 16 again provides a pulsed signal on its output to the enable input of the first stage DC-to-DC converter circuit 20 so that the converter circuit 20 resumes operation as a charge pump to increase the input voltage provided thereon to approximately 4.5 volts. However, no pulsed signal will be provided to the enable input of the first stage DC-to-DC converter circuit 20 from the microcontroller 16 if the voltage on the supercapacitor 14 is below a predetermined threshold voltage, such as 1.5 volts.

The positive side of the lithium polymer battery 18 is connected through a user controlled single pole, single throw switch 26 to the input of a third stage DC-to-DC converter circuit 28, also acting as a charge pump. The third stage DC-to-DC converter circuit 28 is preferably realized using an integrated circuit having Part No. TPS61200DRCT, manufactured by Texas Instruments of Dallas, Tex. The third stage DC-to-DC converter circuit 28 increases the voltage provided by the lithium polymer battery 18 (3.7 volts) to the input of the third stage DC-to-DC converter circuit 28 to approximately 5 volts DC on the output thereof. The output signal of the third stage DC-to-DC converter circuit 28 is provided to a particular pin (+5 volt DC pin) on a USB output connector 30, having another certain pin grounded. An external electronic or electrical device 8, such as a cellular phone, PDA, MP3 player, camera or the like, may be connected to the USB output connector 30 of the energy harvesting circuit using a standard USB cable 10 so that the energy harvesting circuit of the present invention may charge the batteries of the external electronic device 8 or power the external electronic device 8 connected to the energy harvesting circuit by the user.

Figure 3A:
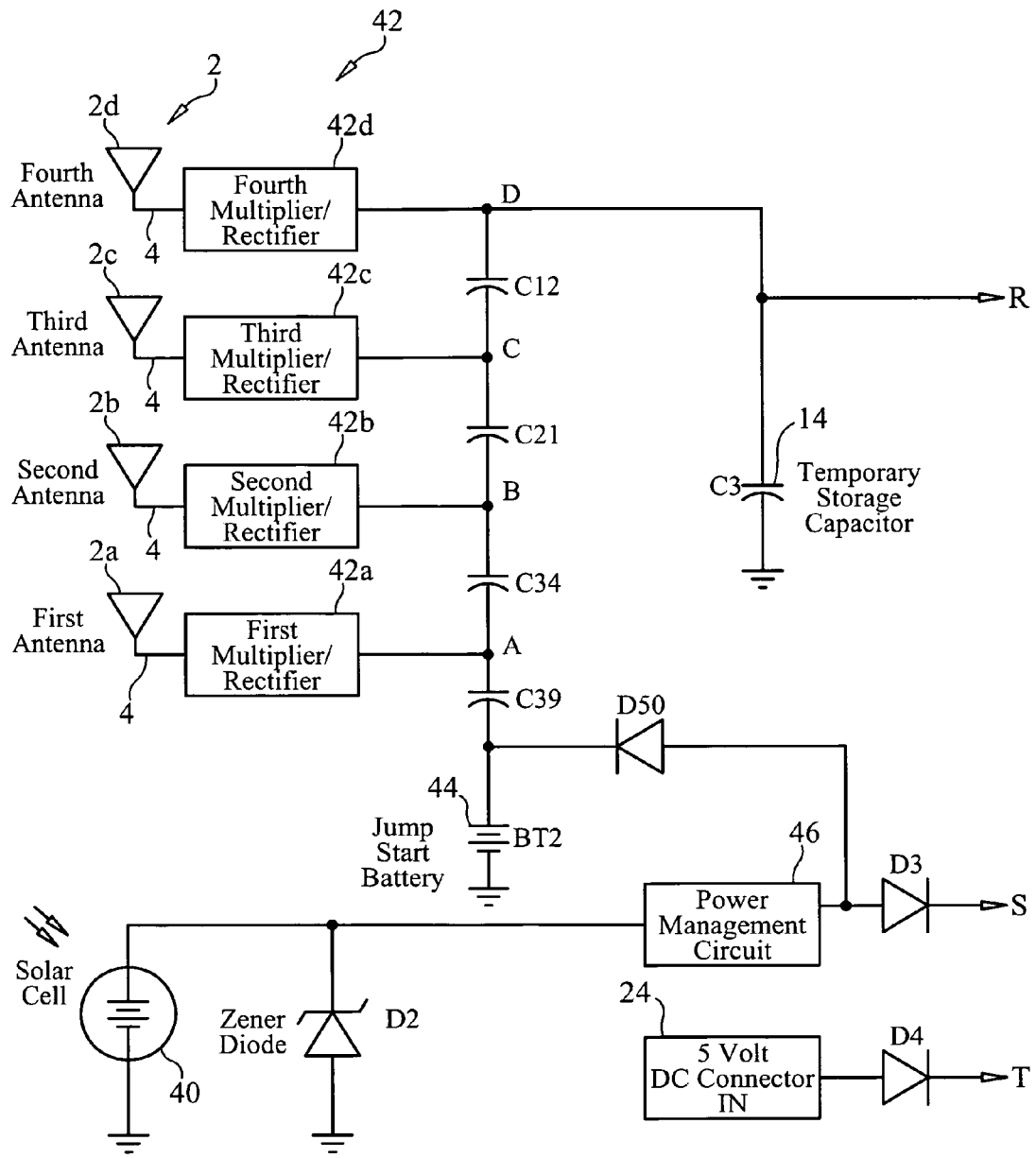
FIG. 3 (i.e., FIGS. 3A and 3B) is a block diagram of a second preferred form of the electrical circuit used in the energy harvesting device of the present invention.
Figure 3B:
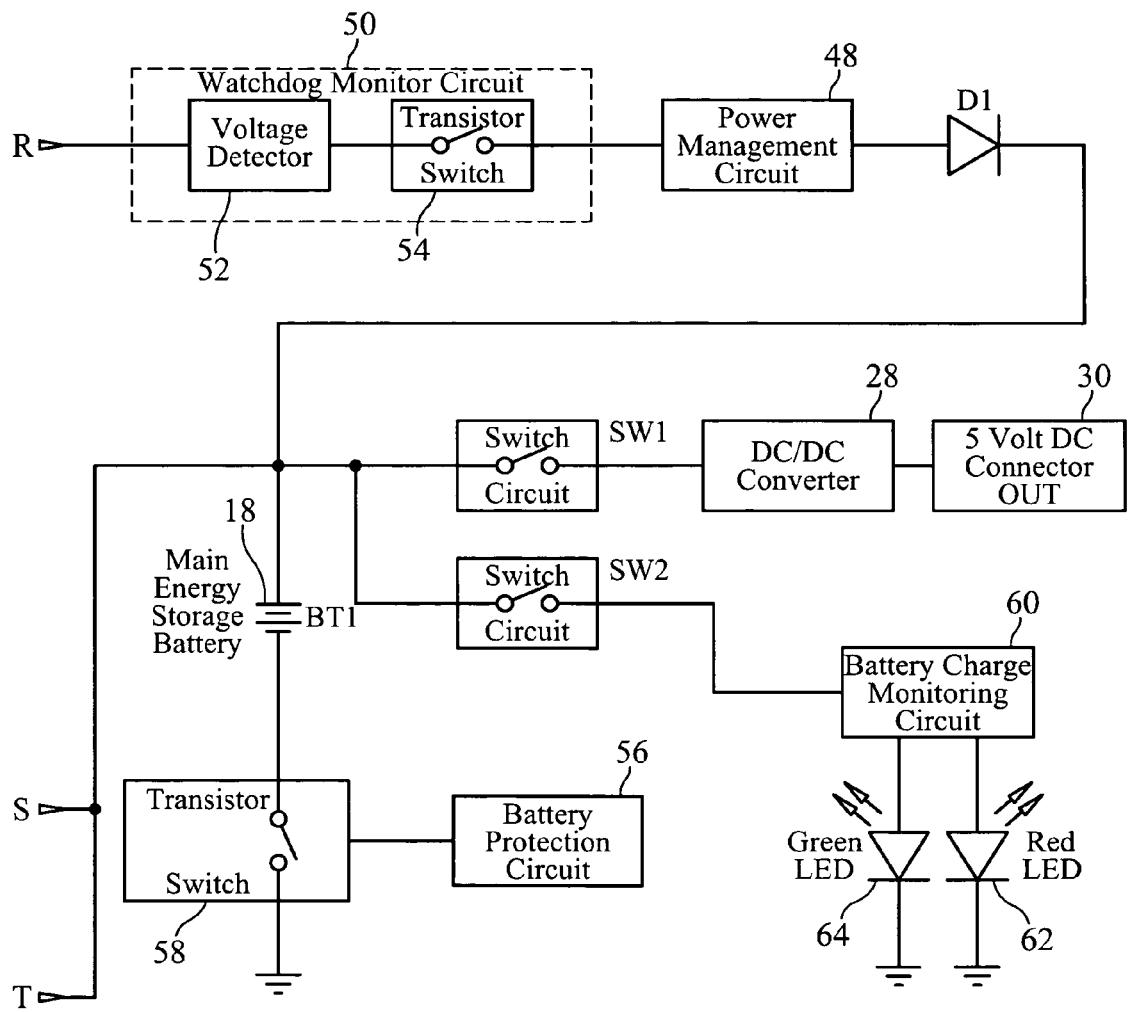

Referring now to FIG. 3 of the drawings, a block diagram of a second preferred form of the electrical circuit of the energy harvesting device of the present invention is shown. Preferably, a plurality of broadband antennas 2, each preferably the same, is used. In one form of the present invention, four broadband antennas 2a, 2b, 2c, 2d are used, and each broadband antenna 2a-2d is particularly situated within the housing 32 for the energy harvesting circuit so that each antenna 2a-2d will be capable of receiving WIFI or other RF signals which are transmitted no matter what disposition the housing 32 is in. Preferably, each broadband antenna 2a-2d is capable of receiving signals from about 500 MHz to about 2.5 GHz.

Figure 5:
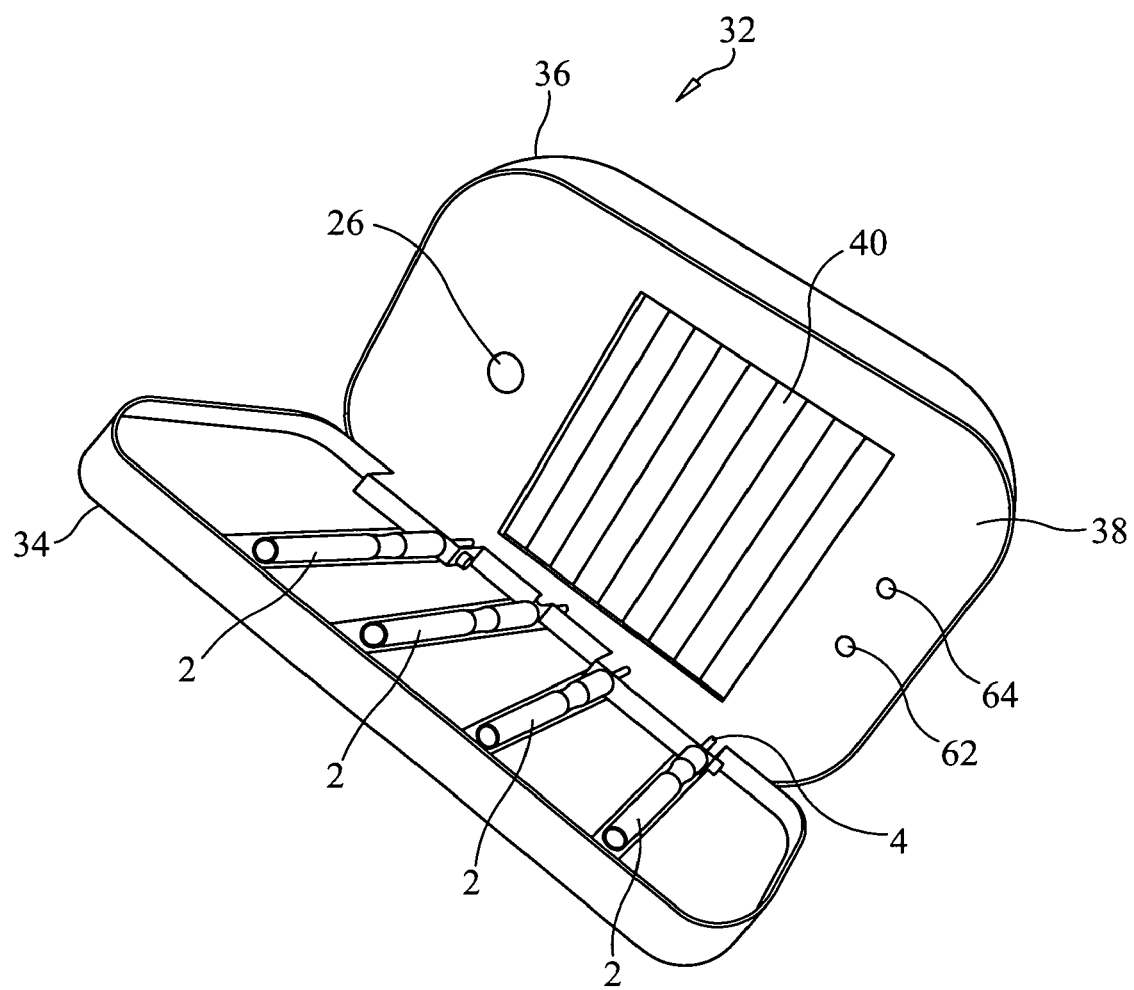
FIG. 5 is a top perspective view of one form of a housing of the energy harvesting device of the present invention, illustrating the cover thereof in an open position.
Figure 6:
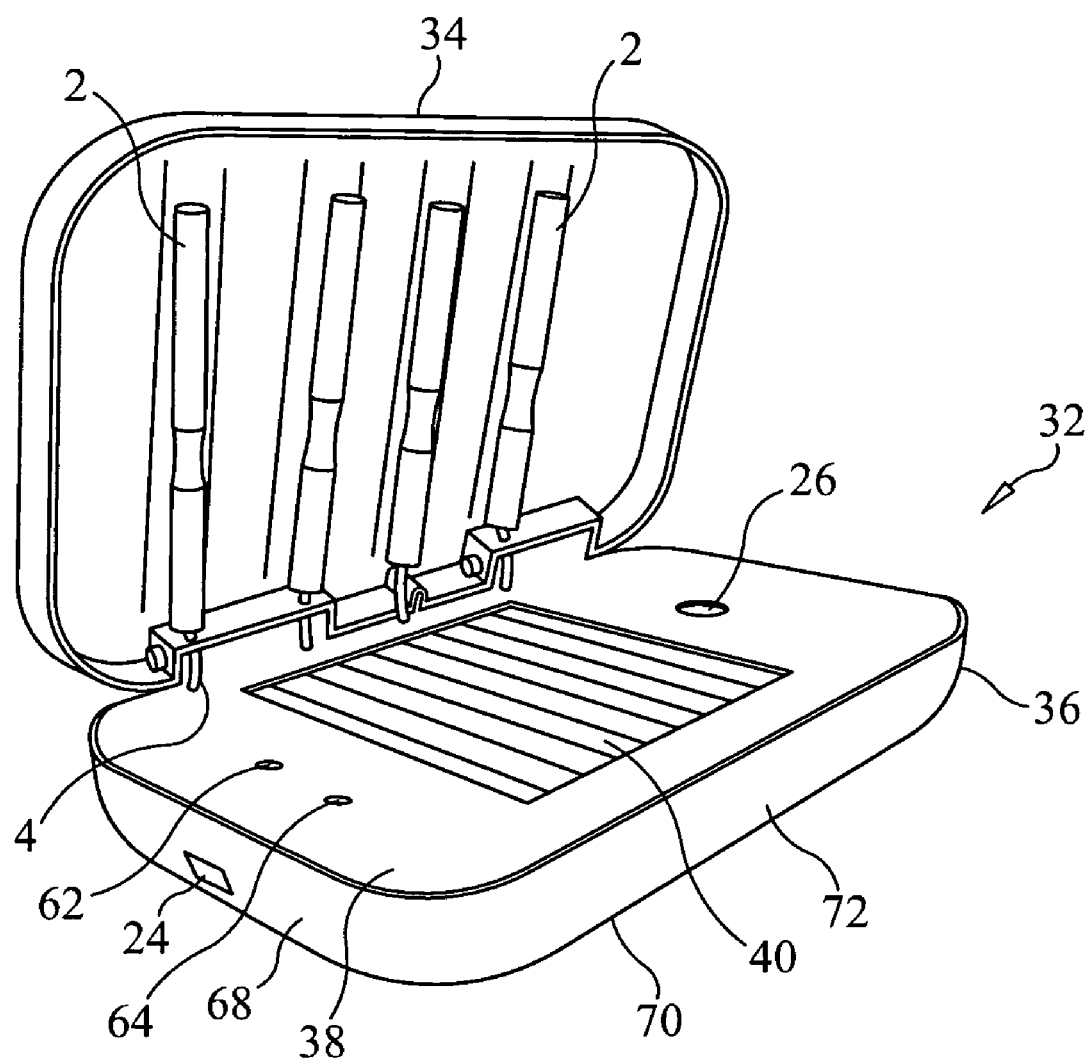
FIG. 6 is a top perspective view of the housing of the energy harvesting device of the present invention shown in FIG. 5 taken from a different angle and illustrating the cover thereof in an open position.
Figure 7:
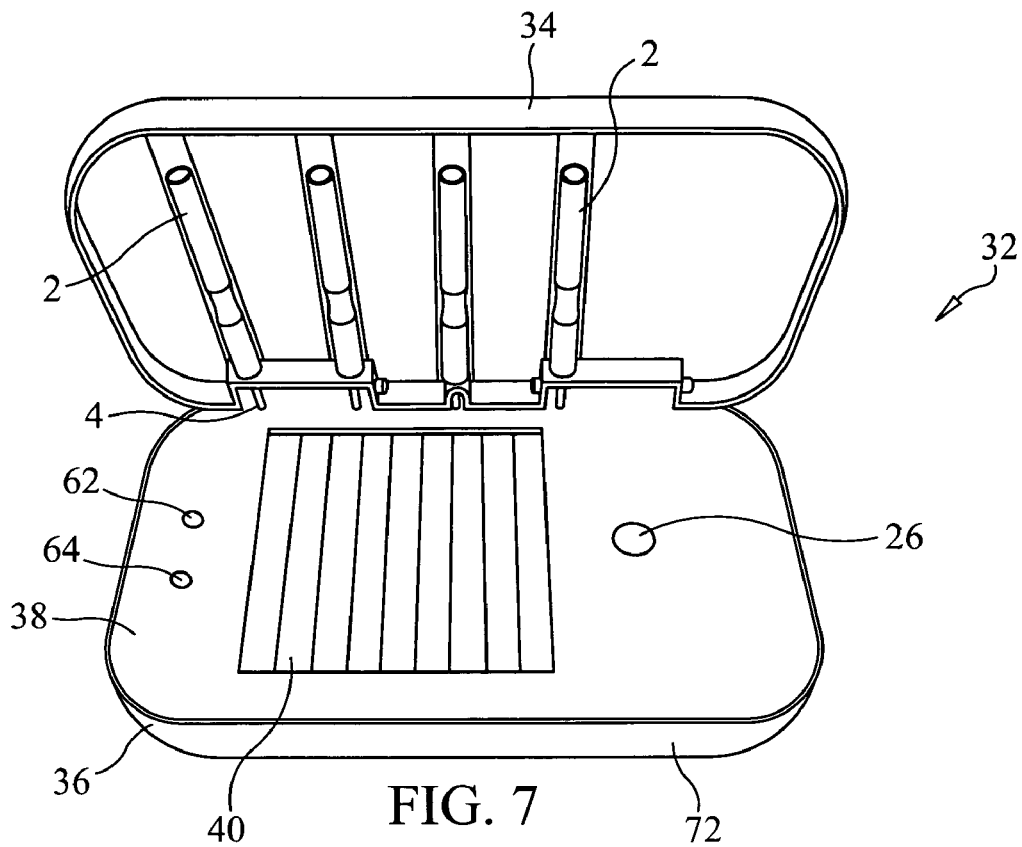
FIG. 7 is a front perspective view of the housing of the energy harvesting device of the present invention shown in FIGS. 5 and 6, illustrating the cover thereof in an open position.
Figure 8:
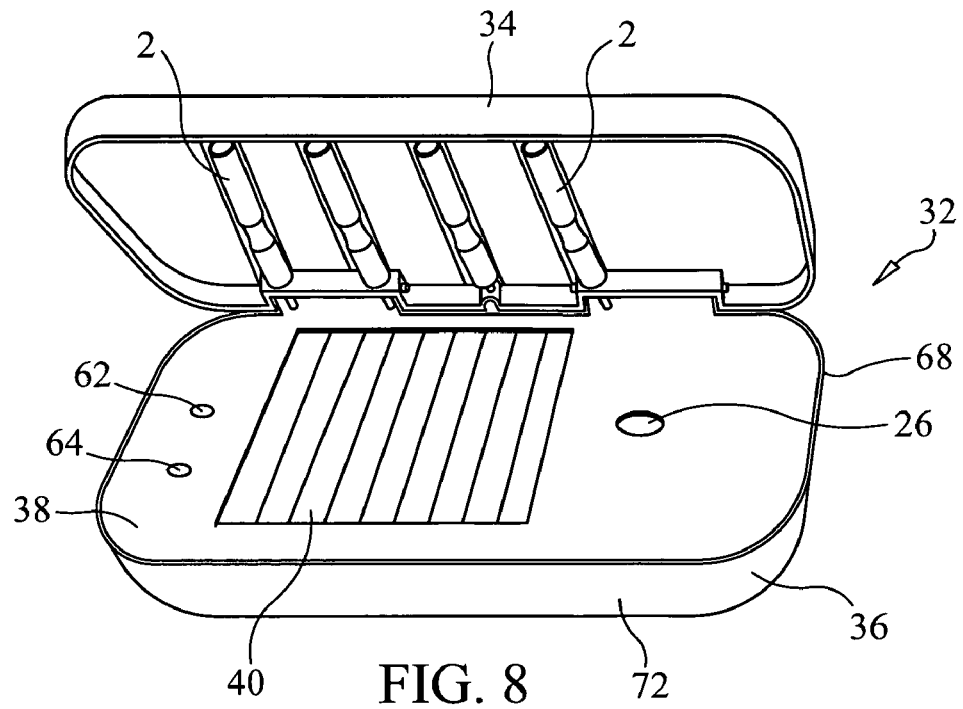
FIG. 8 is a front perspective view of the housing of the energy harvesting device of the present invention shown in FIGS. 5-7 taken from a different angle and illustrating the cover thereof in an open position.

Even more preferably, and as shown in FIGS. 5-10 of the drawings, there are four monopole broadband antennas 2a-2d which are mounted on the inside surface of a transparent or translucent cover 34 of the housing 32. The cover 34 is pivotally joined at one edge thereof to a corresponding lateral or top edge of the main body or base 36 of the housing 32, so that it may be raised and lowered respectively away from and in proximity to the top surface of the main body or base 36, thus covering and uncovering a solar cell 40 which is exposed through an opening formed in the top surface 38 of the main body or base 36. Although the four monopole antennas 2a-2d will receive RF energy when the cover 34 is disposed in its lower position, covering the solar cell 40 of the housing 32, the four monopole antennas will more effectively receive RF energy transmitted from an RF source or WIFI source when the cover 34 is disposed in a raised position, such as shown in FIG. 5 of the drawings. The features of the housing 32 of the energy harvesting device of the present invention will be described in greater detail.

Each antenna 2a-2d of the plurality of antennas is coupled to a respective voltage multiplier/full wave rectifier circuit 42, as shown in FIG. 3. More specifically, each voltage multiplier/rectifier circuit 42 includes a voltage multiplier so that the WIFI or RF signals received by the respective antenna 2a-2d coupled thereto is converted into a DC voltage having an amplitude multiplied a number of times, such as by a factor of 4, 6 or 8, for example.

More specifically, the first antenna 2a is coupled to the first multiplier/rectifier circuit 42a, which converts the WIFI or RF signals the first antenna 2a receives into a DC voltage multiplied by a factor of 4, 6, or 8, for example. The DC output voltage of the first multiplier/rectifier circuit 42a, as a result of the detected signal of the first antenna 2a coupled thereto, is provided to node A and a first leg of a capacitor C39 (see FIG. 3).

The second multiplier/rectifier circuit 42b is very similar to the first multiplier/rectifier circuit 42a. The second multiplier/rectifier circuit 42b converts to a DC voltage the WIFI or RF signals received by the second antenna 2b coupled to it, multiplied by a desired factor (e.g., 4, 6 or 8), and this voltage is provided to node B and a first leg of a capacitor C34, whose second leg is connected to node A and the first leg of capacitor C39. Thus, the output voltage of the second multiplier/rectifier circuit 42b is effectively stacked on top of the voltage outputted by the first multiplier/rectifier circuit 42a.

The third multiplier/rectifier circuit 42c is similar to the second multiplier/rectifier circuit 42b, and it is coupled to the third antenna 2c in the same manner that the first and second multiplier/rectifier circuits 42a, 42b are respectively coupled to the first and second antennas 2a, 2b. Again, the DC voltage outputted by the third multiplier/rectifier circuit 42c, which is provided to node C and the first leg of a capacitor C21, whose second leg is connected to node B and the first leg of capacitor C34, is stacked on top of the DC voltages provided by the first and second multiplier/rectifier circuits 42a, 42b.

The fourth multiplier/rectifier circuit 42d is similar to the third and second multiplier/rectifier circuits 42c, 42b described previously, and is coupled to the fourth antenna 2d. The DC voltage outputted by the fourth multiplier/rectifier circuit 42d is provided to node D and the first leg of a capacitor C12, whose second leg is connected to node C and the first leg of capacitor C21. As a result of RF signals received by the fourth antenna 2d coupled to the fourth multiplier/rectifier circuit 42d, the DC output voltage of the fourth multiplier/rectifier circuit 42d is stacked on top of the DC voltages outputted by the third, second and first multiplier/rectifier circuits 42c, 42b, 42a. Thus, the potential at the first leg of capacitor C12, measured with respect to the second leg of capacitor C39, could be as much as, or possibly more than, 25 volts DC as a result of the stacked arrangement of output voltages from the first, second, third and fourth multiplier/rectifier circuits 42a-42d. As will be explained in greater detail, the second leg of capacitor C39 is coupled to a "jump start" battery BT2 (also referred to as a jump start voltage device 44, and the stacked output voltages from the four multiplier/rectifier circuits 42a-42d are raised by the DC voltage provided by battery BT2.

The combined stacked voltage generated by the interconnected multiplier/rectifier circuits 42a-42d is provided to a capacitor C3. Capacitor C3 acts as a temporary storage device 14 for the voltages detected and rectified by the four multiplier/rectifier circuits 42a-42d as a result of RF energy received by the four receiving antennas 2a-2d. More specifically, the first leg of capacitor C3 is connected to the first leg of capacitor C12 and the second leg of capacitor C3 is grounded. Preferably, capacitor C3 is a low leakage tantalum capacitor, although other storage devices and types of capacitors may be used.

As mentioned previously, capacitor C3 is provided for the temporary storage of the stacked DC voltage outputted by the four multiplier/rectifier circuits 42a-42d, as a result of RF or WIFI energy received by the four antennas 2a-2d connected thereto, as well as the DC voltage of the jump start battery BT2 which raises the stacked voltage at node D.

The circuit of the present invention also preferably harvests light energy by using a solar cell 40 and circuit. In this regard, reference should continue to be had to FIG. 3 of the drawings. A solar cell 40 is provided in the energy harvesting device of the present invention and is exposed through an opening in the top surface 38 of the main body or base 36 of the housing 32 of the energy harvesting device. The solar cell 40 can generate between about 3.1 volts with indoor lighting and about 5.5 volts in direct sunlight. The negative terminal of the solar cell 40 is preferably grounded, and the positive terminal of the solar cell 40 is connected to the cathode of a zener diode D2, whose anode is connected to ground. Preferably, zener diode D2 is a 5.6 volt zener diode to limit the output voltage provided by the solar cell 40 so as not damage any circuitry connected thereto.

The output of the solar cell 40 is connected to the VDD input of a power management integrated circuit 46, such as Part No. CBC3112 manufactured by Cymbet Corporation of Elk River, Minn., or any similar power management circuit made by a number of manufacturers. The output voltage of the power management circuit 46, which is regulated and selected to be about 4.2 volts, is provided through an isolation diode D3 to the positive side of the main energy storage battery BT1 (i.e., second or main storage device 18) to help maintain the charge on battery BT1 when no or negligible WIFI or RF signals are present or can be detected and when ambient light conditions permit the charging of battery BT1 by the solar cell 40.

To help "jump start" or boost the charge on the temporary storage capacitor C3, a 3.7 volt, 60 milliampere-hour or greater, lithium polymer battery BT2 is used (see FIG. 3). The negative side of battery BT2 is grounded, while the positive side is coupled to the second leg of capacitor C39 in order to raise the stacked voltage generated by the four interconnected multiplier/rectifier circuits 42a-42d by 3.7 volts, i.e., the voltage of battery BT2. Accordingly, the voltage across capacitor C3 is the voltage resulting from the combination of the voltage from battery BT2 and the RF or WIFI energy harvested by the circuit of the present invention. It should be noted that the 25 volt DC signal resulting from the stacked arrangement of the four multiplier/rectifier circuits 42a-42d is an unloaded voltage, and when used under load to charge capacitor C3, the voltage drops significantly.

The voltage from battery BT2 is used to boost the voltage temporarily stored on 42d capacitor C3 and to supplement the voltage outputted by the four multiplier/rectifier circuits 42a-42d resulting from the WIFI and RF energy which is harvested. Furthermore, the "boost" voltage from battery BT2 helps insure that a second power management circuit 48 (see FIG. 3) has a sufficient voltage on its VDD input in order to operate.

It is estimated that a 60 milliampere-hour battery used as battery BT2 will last for approximately 1500 hours, or about 62 days, when the energy harvesting device of the present invention is stored in a dark room, thus with no voltage being generated by the solar cell 40, as the circuit draws only about 25 microamperes to about 40 microamperes of current from battery BT2.

To maintain the charge on battery BT2, the output voltage generated by the power management circuit 46 is provided to the anode of an isolation diode D50, whose cathode is connected to the positive side of battery BT2. In this way, the power management circuit 46 acts as a buffer between the solar cell and battery BT2 to prevent battery BT2 from overcharging, which may result in the battery overheating.

Alternatively, to charge battery BT2, the positive lead of the solar cell 40 may be coupled to the positive side of battery BT2 through a diode (not shown), the anode of the diode being connected to the positive lead of the solar cell 40, and the cathode of the diode being connected to the positive side of battery BT2. Optionally, a PTC (positive temperature coefficient) thermistor (not shown) may be connected to battery BT2 between the solar cell 40 and the battery BT2 to provide some protection to the circuit in the remote chance that battery BT2, which is preferably a lithium polymer battery, overheats due to overcharging or short circuiting.

Referring again to FIG. 3 of the drawings, it will be seen that a second power management circuit 48 is provided, and is indirectly coupled to the temporary storage capacitor C3. Preferably, a watchdog monitor circuit 50 is disposed between capacitor C3 and the VDD input of the power management circuit 48, as will be explained in greater detail. Power management circuit 48 may be Part No. CBC3112 manufactured by Cymbet Corporation of Elk River, Minn., or any similar power management circuit made by a number of manufacturers. The VBAT output of the power management circuit 48 is connected to the anode of diode D1, as will be explained in greater detail.

Since the power management circuit 48, like the power management circuit 46, requires about 2.6 volts on its VDD input in order to operate, the energy harvesting circuit of the present invention preferably includes a watchdog monitor circuit 50 situated between the temporary storage capacitor C3 and the power management circuit 48 in order to minimize the unnecessary discharge of energy stored in capacitor C3 when there is insufficient voltage on capacitor C3 for the power management circuit 48 to operate. The watchdog monitor circuit 50 may include a voltage detector circuit 52 and a transistor switch circuit 54 connected thereto and controlled thereby. The voltage detector circuit 52 may be a constant voltage power monitor with hysteresis and having Part No. S-80825 manufactured by Seiko Instruments, Inc. of Chiba, Japan.

The watchdog monitor circuit 50 comprising the voltage detector circuit 52 and the transistor switch circuit 54 is used to minimize any leakage from the temporary storage capacitor C3 by preventing a direct connection between capacitor C3 and the VDD input of the second power management circuit 48 when the voltage on the temporary storage capacitor C3 is below a predetermined voltage. More specifically, when the voltage is below about 2.6 volts on capacitor C3, the voltage detector circuit 52 of the watchdog monitor circuit 50 provides an output signal to the transistor switch circuit 54 to open the transistor switch circuit 54 and prevent the voltage on capacitor C3 from being connected therethrough to the VDD input of the second power management circuit 48 so that circuit 48 does not drain the energy from the WIFI or RF energy harvesting circuit stored on capacitor C3. However, if the voltage on capacitor C3 rises above about 2.6 volts, the voltage detector circuit 52 of the watchdog monitor circuit 50 outputs a signal to close the transistor switch circuit 54 so that the voltage on capacitor C3 is provided to the VDD input of the second power management circuit 48. Typically, the voltage on the temporary storage capacitor C3 will range between about 2.5 volts and about 2.65 volts, and only when this voltage is equal to or above about 2.6 volts will capacitor C3 be effectively connected to the input of the second power management circuit 48. A general form of the watchdog monitor circuit 50 described above may be found in the application notes accompanying the data sheet of the S-808xxC series of voltage detectors disseminated by Seiko Instruments Inc. (see FIGS. 14 and 20 thereof).

The power management circuit 48 has a charge pump which converts the 2.6-2.65 voltage (or, more specifically, any voltage above 2.63 volts) on its input to between about 4.1 volts DC and about 4.2 volts DC on its VBAT output. The VBAT output of the second power management circuit 48 is connected to the anode of a low voltage drop (about 0.1 volts) isolation diode D1. The cathode of diode D1 is connected to the positive side of a 3.7 volt, 1000 milliampere-hour, lithium polymer battery BT1, which acts as the main energy storage battery or device 18.

Preferably, a battery protection circuit 56 is connected to the battery BT1 to provide overcharge protection and over-discharge protection. The battery protection circuit 56 is preferably Part No. DW01 manufactured by Fortune Semiconductor Corporation of Taipei, Taiwan, which monitors the voltage on the positive side of battery BT1, and drives a transistor switch circuit 58 situated between the negative side of the battery and ground to selectively connect and disconnect the negative side of battery BT1 to and from ground.

When the voltage on the lithium battery BT1 exceeds a certain predetermined overcharge protection voltage, charging of battery BT1 is inhibited by the battery protection circuit 56 opening the transistor switch circuit 58 to disconnect the battery BT1 from ground. On the other hand, when the voltage of the lithium battery BT1 falls below a predetermined over-discharge protection voltage, discharging of battery BT1 is inhibited by the battery protection circuit 56 opening the transistor switch circuit 58 to disconnect the battery BT1 from ground. Essentially, the negative side of battery BT1 is disconnected from ground when either an overcharge condition or an over-discharge condition exists. When neither condition exists, the battery protection circuit 56 closes the transistor switch circuit 58 to connect the negative side of the battery BT1 to ground.

The energy harvesting circuit of the present invention also preferably includes a battery charge monitoring circuit 60 to provide an indication to the user of the energy harvesting device whether the lithium battery BT1 is sufficiently charged to power an external electronic device 8 connected to the energy harvesting circuit or to charge the battery or batteries of the external device. Preferably, the battery charge monitoring circuit 60 includes a voltage divider network (having interconnected resistors) (not shown) operatively coupled to the positive side of the battery BT1 and used to bias a transistor (not shown) on or off, depending on the voltage of the battery. A single pole, single throw (or equivalent) momentary push button switch SW2 (or switch circuit) is connected between the positive side of the lithium battery BT1 and the battery charge monitoring circuit 60, and is preferably mounted on the top surface 38 of the housing 32 so as to be accessible to the user of the energy harvesting device. Accordingly, so as not to drain the charge from battery BT1, the battery charge monitoring circuit 60 will only work when the user presses on momentary push button switch SW2 to provide power to the battery charge monitoring circuit 60.

A dual color (red/green) light emitting diode (LED) or separate red and green LEDs 62, 64 are operatively coupled to and driven by the battery charge monitoring circuit 60, and are preferably mounted on the top surface 38 of the housing 32, or elsewhere on the housing, to be viewable by the user of the energy harvesting device.

When the voltage on battery BT1 is 3.3 volts or greater, the battery charge monitoring circuit 60 will cause the green LED 64 to light when the user presses on momentary push button switch SW2. If the voltage on battery BT1 is 3.0 volts or lower, the battery charge monitoring circuit 60 will cause the red LED 62 to illuminate when the user presses on momentary push button switch SW2. The 3.3 volt threshold and the 3.0 volt threshold may be adjusted by changing the values of resistors from which the voltage divider network is formed to turn the transistor on or off at different voltage levels.

As shown in FIG. 3, a single pole, single throw switch or switch circuit SW1 has one side connected to the positive side of the lithium polymer battery BT1 or other storage device. The switch or switch circuit SW1 is provided to ensure that stored energy is not drawn from the battery until desired by the user. As will be explained in greater detail, the switch SW1 is coupled to a spring biased, sliding cover 66 on the housing 32 for the energy harvesting circuit (see FIG. 10) that selectively covers an output USB type A connector 30, and will be automatically activated to provide electrical conduction therethrough when the user slides the USB connector cover 66 in one direction on the main body or base 36 of the housing 32.

The other side of the switch or switch circuit SW1 is connected to the input of a DC/DC boost converter circuit 28, which may be an integrated circuit having Part No. TPS61200DRCT, manufactured by Texas Instruments of Dallas, Tex. This DC/DC converter circuit 28 is configured with external components to convert the 3.7 volts of the lithium polymer battery BT1 to a 5 volt DC output.

Figure 10:
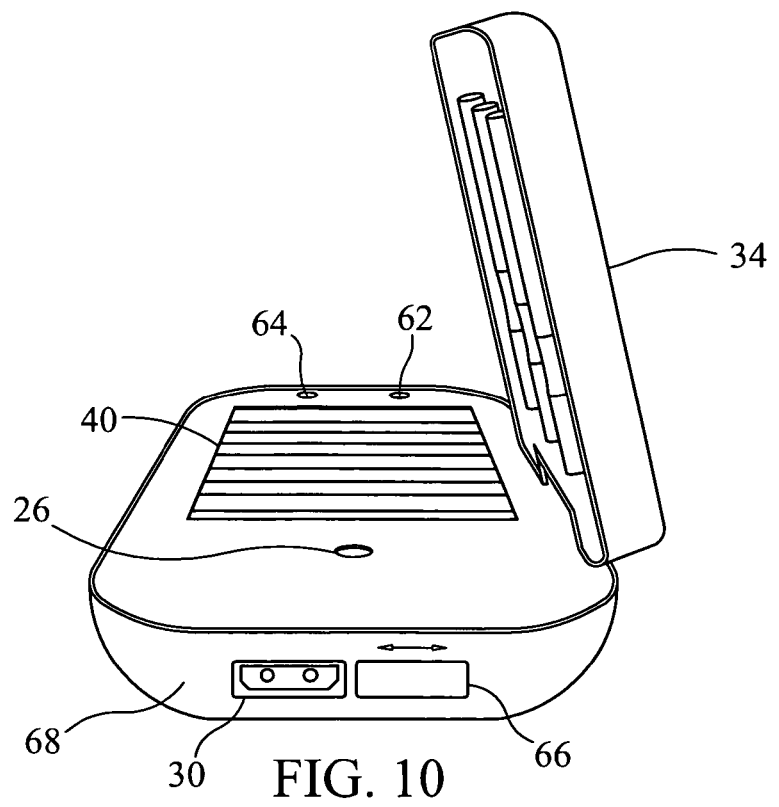
FIG. 10 is a second side perspective view of the housing of the energy harvesting device of the present invention shown in FIGS. 5-9 and illustrating the cover thereof in an open position.

A 5 volt DC regulated voltage is preferably provided by the DC/DC boost converter circuit 28 to the USB connector 30 of the energy harvesting circuit to which an external electronic device 8 is connectable. Preferably, pin 1 (VCC) of the output connector 30 provides a 5 volt DC output signal to the external electronic device 8. As shown in FIG. 10 of the drawings, USB output connector or port 30 is preferably positioned on one of the narrower sides 68 of the housing 32 of the energy harvesting device.

Thus, the circuit configuration described above will allow the output of this USB type A connector 28 to be able to provide the correct charge voltage and current for iPhone™, iPod™ and iPad™ devices, which are manufactured by Apple, Inc. Also, this circuit configuration will be compatible and provide correct charge voltage and current to most if not all smart phones, PDAs, MP3 players and Blackberry™ devices.

As mentioned previously, the energy harvesting device of the present invention may include an input connector 24 for receiving a charging voltage from an external power source, such as another electronic device, or a power transformer which may be connected to a cigarette lighter of an automobile, or may be an AC/DC adapter which is connectable to a standard house wall outlet, for example. The power signal from this external electrical power source is provided to the anode of an isolation diode D4, whose cathode is in electrical communication with the positive side of the lithium battery BT1 or other storage device internal to the energy harvesting circuit so that the lithium battery or storage device may be charged thereby.

Figure 9:
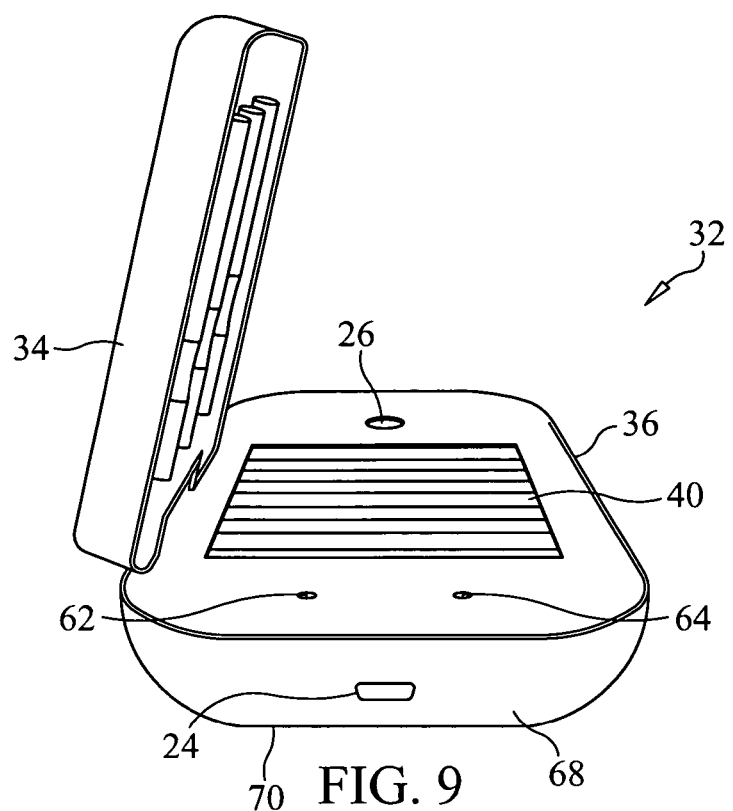
FIG. 9 is a first side perspective view of the housing of the energy harvesting device of the present invention shown in FIGS. 5-8 and illustrating the cover thereof in an open position.

More specifically, and as shown in FIGS. 3 and 9 of the drawings, a mini USB connector 24 is provided on one side (preferably on one of the narrower sides 68 not occupied by output USB connector 30) of the housing 32 of the energy harvesting device. Input connector 24 is provided so that the user may connect to connector 24 an AC/DC wall outlet adapter, or another adapter or transformer which is connectable to an auxiliary power outlet or cigarette lighter in an automobile, or to an output port providing a 5 volt DC output signal of an electronic device, such as a laptop computer. Preferably, pin 1 (VCC) of connector 24 provides a 5 volt DC input signal to the circuit.

The 5 volt DC input signal on connector 24 is provided to the anode of isolation diode D4. The cathode of diode D4 is electrically connected directly or through a resistor (not show) to the positive side of the lithium battery BT1 so that the lithium battery of the energy harvesting circuit may be charged externally by the AC/DC adapter, power transformer, automobile power outlet, laptop computer or the like connected to the mini USB connector 24.

Also, with an external power source connected to the input USB connector 24, and with switch SW1 in a closed position, the external power source will provide power to the output USB connector 30 and to an external electronic device 8 coupled thereto.

Referring now to FIGS. 5-10 of the drawings, it will be seen that a preferred form of the housing 32 for the energy harvesting circuit includes a main body or base 36 which is rectangular in shape overall, and a transparent or translucent cover 34 that is pivotally joined to a longer edge (or, alternatively, a narrower edge) of the top surface 38 of the main body 36. The solar cell 40 is mounted on the top surface 38 of the main body 36 or through a window formed through the thickness of the main body so as to be exposed to ambient light. The transparent cover 34 is pivotable on the top surface 38 between a closed position, where it covers the top surface 38 or at least the solar cell 40 mounted on the top surface, and an open position, where it is raised from the top surface 38 of the main body 36 to a position which is substantially perpendicular to the plane in which the top surface 38 of the main body resides. Thus, if the bottom surface 70, which is opposite the top surface 38, of the main body 36 rests on a horizontal supporting surface, such as a table or desk, then the transparent cover 34 may be pivoted to a substantially vertical position.

As mentioned previously, there are preferably four antennas 2a-2d which are spaced apart from each other a predetermined distance, which are mounted to the transparent cover 34 on the inside surface thereof. For best WIFI or RF signal reception, it is preferred that these broadband antennas 2a-2d, preferably being monopole antennas, are disposed in a vertical position. As such, it is preferred if the user of the energy harvesting device of the present invention raises the transparent cover 34 to a vertical position when he chooses to charge the internal battery BT1 of the energy harvesting circuit with WIFI or RF signals present in the location where the energy harvesting device is situated.

Preferably, the cover 34 is transparent or translucent, as mentioned previously, so that the solar cell 40 of the energy harvesting circuit will receive light energy through the cover 34 to charge the internal lithium battery BT1, even if the cover 34 is in a closed position.

Also, as mentioned previously, so as not to discharge the internal lithium battery BT1 unnecessarily when no external electronic device 8 is being powered by the energy harvesting circuit, a sliding cover 66 is provided over the output USB connector 30, and the switch SW1 is operatively coupled to, and activated by, movement of the USB connector sliding cover 66.

More specifically, the USB output connector 30 is preferably situated on a smaller side 68 of the main body 36 of the housing 32 opposite that of the input USB connector 24 (although the connectors 30 and 24 could be mounted on opposite wider sides 72 of the housing 32). There is a small cover 66 for the output USB connector 30 so that a user may slide this cover 66 and connect the output USB connector 30 to an external electronic device 8 in order to power or recharge the batteries of the external electronic device. When the sliding cover 66 is positioned such that it uncovers the output USB connector 30, it automatically engages and activates the single pole, single throw switch or switch circuit SW1 so that the battery BT1 or other storage device is electrically connected to the input of the DC/DC boost converter 28 to provide a 5 volt output voltage on the output USB connector 30.

When the sliding cover 66 is returned to its closed position, covering the output USB connector 30, it deactivates the switch or switch circuit SW1, breaking the connection between the lithium battery BT1 or other storage device within the energy harvesting circuit and the DC/DC converter circuit 28, so that no power is provided to the output USB connector 30. The sliding cover 66, in this closed position, covers the output USB connector 30 to prevent access thereto. In a preferred form of the present invention, the sliding cover 30 may be biased by a spring (not shown) so that it automatically returns to a closed position, covering the output connector 30 and deactivating switch SW1, when no external electronic device 8 is connected to output connect or connector 30 of the energy harvesting device.

The purpose of having the sliding cover 66, covering and uncovering the output USB connector 30, is to minimize any energy drain from the lithium battery BT1 when there is no need to provide power to an external electronic device 8. It should be realized that the user controlled switch 26 mounted on the top surface 38 of the base 36 may be omitted if the sliding cover 66 coupled to switch SW1 to activate switch SW1 is used. Alternatively, the switch labeled with reference number 26 shown in FIGS. 5-10 may instead be used as switch SW2, which may be a momentary push button switch, which the user presses to momentarily activate the battery charge monitoring circuit 60 to illuminate the red LED 62 or the green LED 64 so as to minimize any drain on the lithium battery BT1.

In one form of the present invention, the four antennas 2a-2d are identical to one another and have the same or similar broadband bandwidth characteristics. In an alternative form of the present invention, the energy harvesting circuit may include several narrow band antennas 2, such as one UHF antenna to receive signals in the range from between about 500 MHz and about 700 MHz, one cell phone and 900 MHz antenna to receive signals in the range from between about 850 MHz and about 928 MHz, one GSM band antenna to receive signals in the range from between about 1.8 GHz and about 1.9 GHz, and one WiFi/WiMAx/Satellite radio antenna to receive signals in the range from between about 2.3 GHz and about 2.5 GHz, each antenna 2 being connected to a respective multiplier/rectifier circuit 42 through a coaxial cable 4 (see FIG. 9).

Figure 4A:
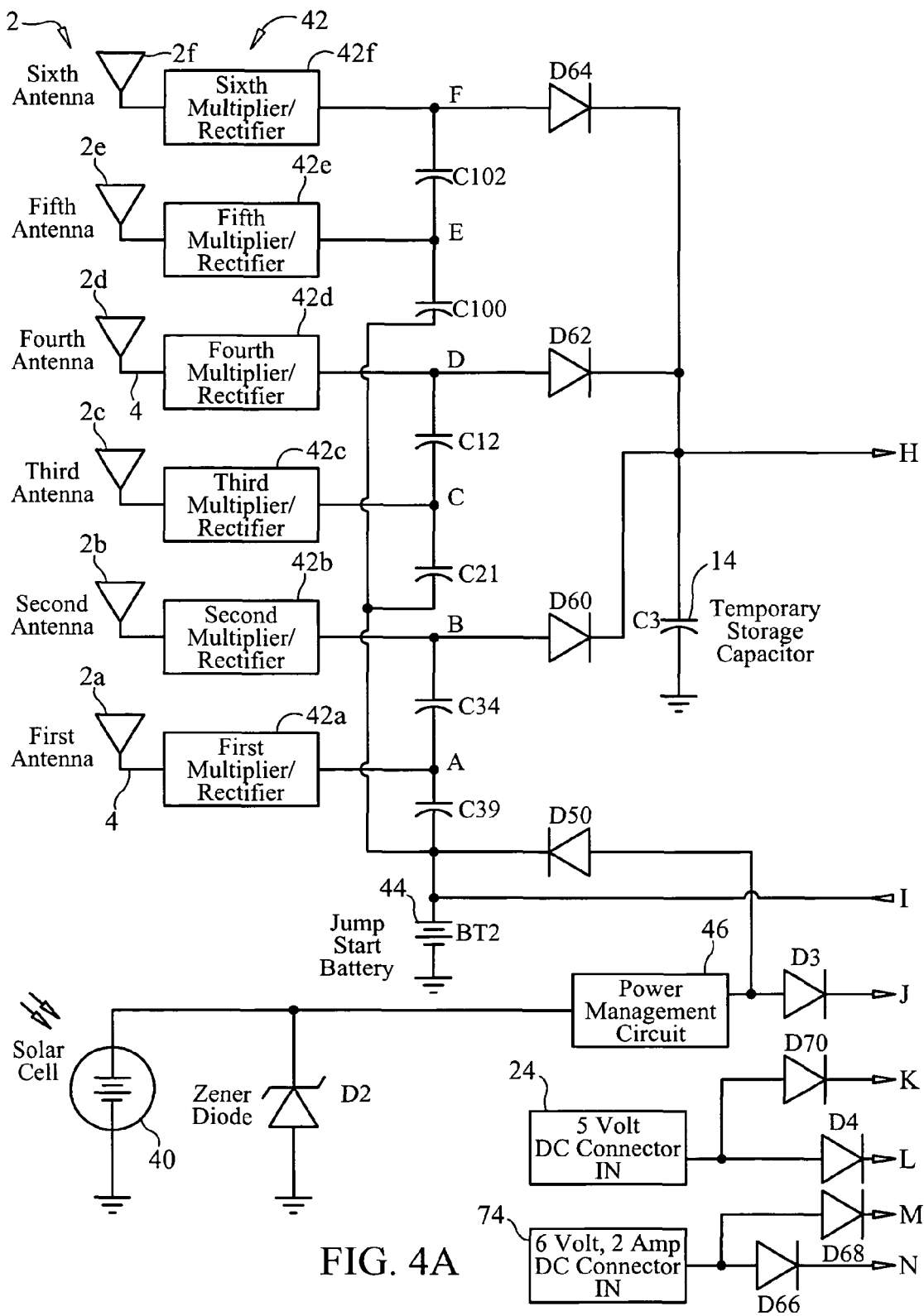
FIG. 4 (i.e., FIGS. 4A and 4B) is a block diagram of third preferred form of the electrical circuit used in the energy harvesting device of the present invention.
Figure 4B:
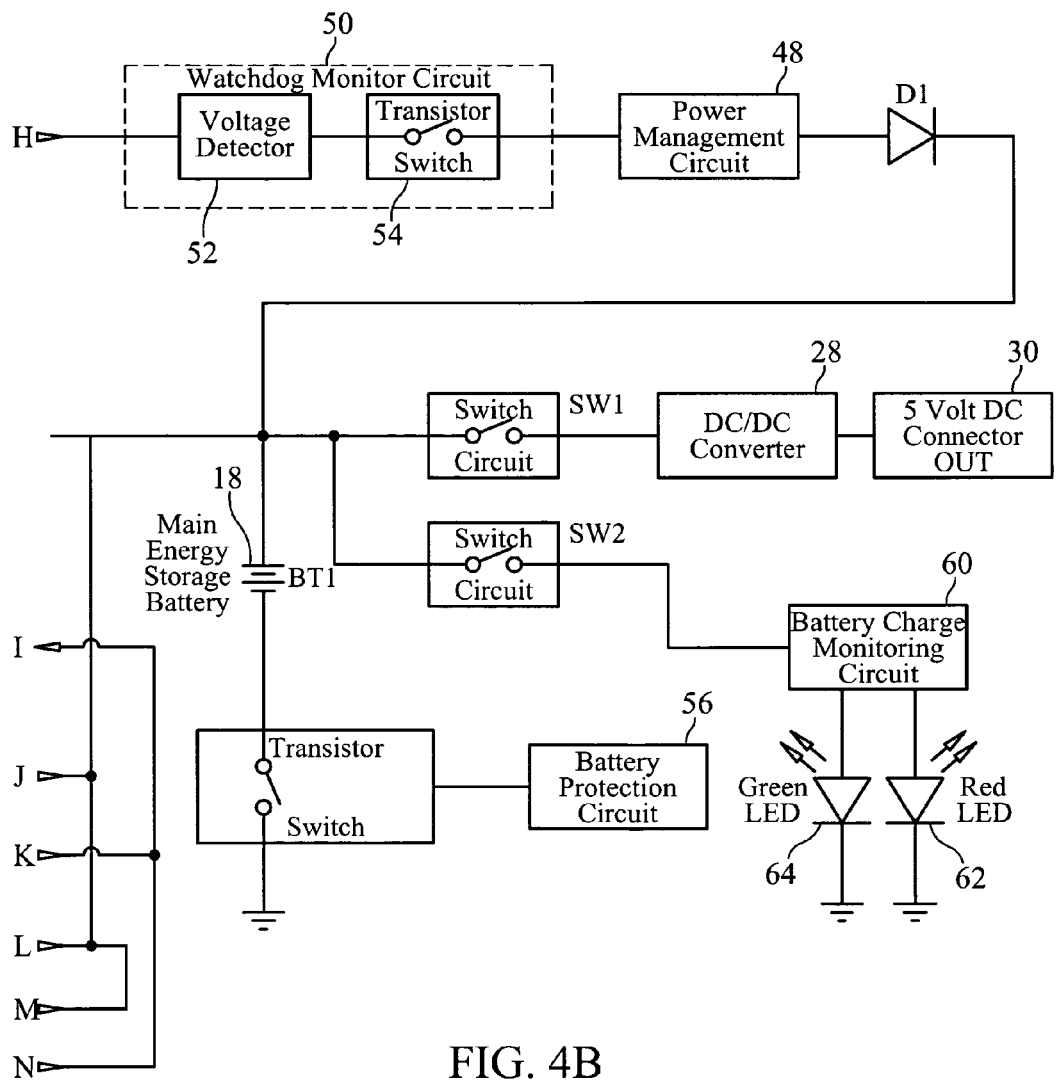
Figure 11:
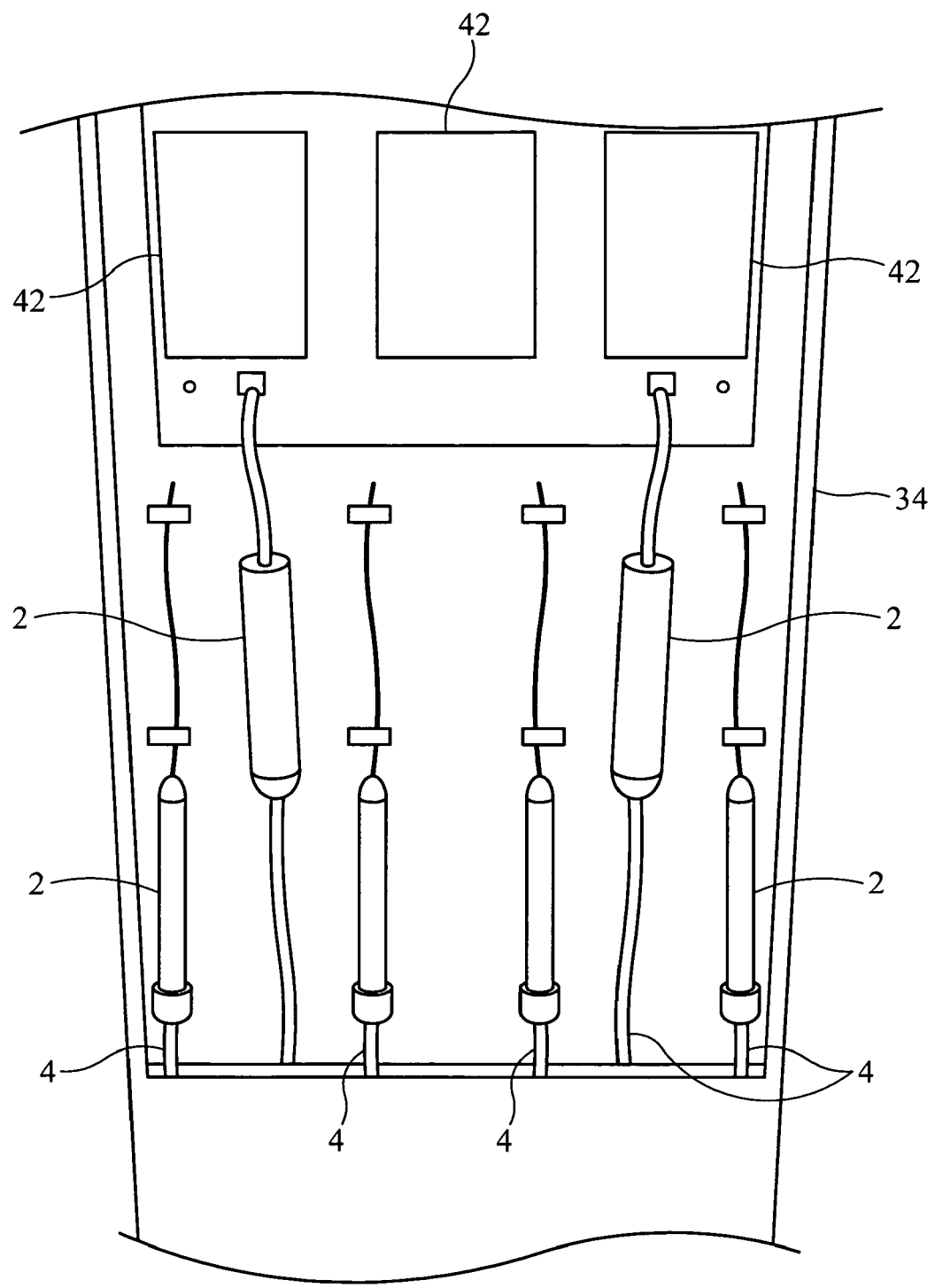
FIG. 11 is a perspective view of a portion of the cover of another form of a housing of the energy harvesting device of the present invention, illustrating the cover thereof in an open position and an alternative arrangement of antennas thereon.

Reference should now be had to FIGS. 4 and 11 of the drawings, which show another (third) preferred embodiment of the energy harvesting device of the present invention. The circuit shown in the schematic diagram of FIG. 4 is similar in many respects to the circuit shown in FIG. 3. However, in this preferred form, there are six (6) antennas 2a-2f provided (also as shown in FIG. 10) and six (6) multiplier/rectifier circuits 42a-42f. Therefore, there are nodes A-F associated with the outputs of the first multiplier/rectifier circuit 42a through the sixth multiplier/rectifier circuit 42f, respectively.

In this alternative embodiment of the circuit shown in FIG. 4, the output voltages from the first multiplier/rectifier circuit 42a and the second multiplier/rectifier circuit 42b are stacked together in series on top of the voltage of the jump start battery BT2, and the stacked voltage of the first multiplier/rectifier circuit 42a and the second multiplier/rectifier circuit 42b is provided at node B and to the temporary storage capacitor C3 through a diode D60, whose anode is connected to node B and whose cathode is connected to temporary storage capacitor C3.

Similarly, the output voltages of the third multiplier/rectifier circuit 42c and the fourth multiplier/rectifier circuit 42d are stacked in series on the voltage of the jump start battery BT2. The stacked voltage of the fourth multiplier/rectifier circuit 42d and the third multiplier/rectifier circuit 42c is provided at node D and to the temporary storage capacitor C3 through diode D62, whose anode is connected to node D and whose cathode is connected to the temporary storage capacitor C3.

In the same manner, the output voltage of the fifth multiplier/rectifier circuit 42e and the output voltage of the sixth multiplier/rectifier circuit 42f, whose inputs are respectively connected to the fifth antenna 2e and the sixth antenna 2f, are stacked in series on the voltage of the jump start battery BT2. The stacked voltage of the sixth multiplier/rectifier circuit 42f and the fifth multiplier/rectifier circuit 42e is provided at node F (node E is the output voltage at the fifth multiplier/rectifier circuit 42e) and is provided to the temporary storage capacitor C3 through diode D64, whose anode is connected to node F and whose cathode is connected to the temporary storage capacitor C3.

More specifically, the positive side of the jump start battery BT2 is connected to a first leg of each of capacitors C39, C21 and C100. The second leg of each of capacitors C39, C21 and C100 is respectively connected to node A and capacitor C34 (and the output of the first multiplier/rectifier circuit 42a); node C and capacitor C12 (and the output of the third multiplier/rectifier circuit 42c); and node E and the first leg of capacitor C102 (and the output of the fifth multiplier/rectifier circuit 42e). The second leg of capacitor C102 is coupled to node F, the anode of diode D64 and the output of the sixth multiplier/rectifier circuit 42f.

In other words, the outputs of the first and second multiplier/rectifier circuits 42a, 42b are connected in series, the outputs of the third and fourth multiplier/rectifier circuits 42c, 42d are connected in series, and the outputs of the fifth and sixth multiplier/rectifier circuits 42e, 42f are connected in series, to form three groups, and the output voltages of the series-connected groups are effectively connected in parallel with each other and provided to the temporary storage capacitor C3. This provides approximately 8-12 volts to charge the temporary storage capacitor C3, but at greater current capacity (because of the parallel arrangement of multiplier/rectifier groups) than having the outputs of the individual multiplier/rectifier circuits 42a-42f all connected in series in a stack.

It should be realized that a greater or fewer number of parallel-connected groups of series-connected multiplier/rectifier circuits 42a-42f may be used to generate the voltage to charge the temporary storage capacitor C3. For example, the third group consisting of the fifth and sixth multiplier/rectifier circuits 42e, 42f, and the corresponding fifth and sixth antennas 2e, 2f to which the fifth and sixth multiplier/rectifier circuits 42e, 42f are respectively connected, may be omitted to satisfy space constraints in the arrangement of the antennas 2 on the housing 32 of the energy harvesting device and to provide sufficient separation between adjacent antennas 2 in order to minimize any cross-coupling of the antennas.

This alternative circuit of the energy harvesting device of the present invention also includes a 6 volt DC, 2 amp (or the like) input connector 74, which allows the main energy storage battery BT1 to be charged up to approximately 75 percent of its capacity in about 30 minutes. As can be seen from FIG. 4 of the drawings, the output voltage on the quick charge connector 74 is provided to the main energy storage battery BT1 through diode D68, whose anode is operatively connected to the output of connector 74 and whose cathode is operatively connected to the main energy storage battery BT1. Also, the output voltage on quick charge connector 74 is provided to the jump start battery BT2 to charge that battery as well, through diode D66, whose anode is operatively connected to the output of the connector 74 and whose cathode is operatively connected to the positive side of jump start battery BT2.

Furthermore, the 5 volt DC connector 24 provides a charging voltage to the main energy storage battery BT1 through diode D4, as mentioned previously with the circuit shown in FIG. 3, but also provides a charging voltage to the jump start battery BT2 through diode D70, whose anode is operatively connected to the output of connector 24 and whose cathode is operatively connected to the positive side of jump start battery BT2.

Similarly, the output voltage of the power management circuit 46, which is derived from the solar cell voltage, is provided through diode D3 to the main energy storage battery BT1 and through diode D50 to the positive side of jump start battery BT2, in the same manner as shown in the schematic diagram for the circuit shown in FIG. 3.

With reference to FIG. 11 of the drawings, it can be seen that the six (6) antennas 2a-2f are arranged side-by-side on the cover 34 of the housing 32, which may be raised from the base 36 of the housing vertically so as to optimize the reception capabilities of the antennas. Although in FIG. 11 the six antennas 2a-2f are shown mounted on the cover 34 transversely along the narrower side of the cover, which is hingedly joined to the base 36 of the housing 32, it is envisioned to be within the scope of the present invention to arrange the six antennas 2a-2f along the longer side of the cover 34 and having the longer side of the cover hingedly mounted to the longer side 72 of the base 36 of the housing 32 to provide a greater distance between adjacent antennas 2a-2f and to minimize or eliminate any possible coupling between adjacent antennas.

The energy harvesting circuit of the present invention, in its preferred form, detects WIFI signals, WiMax, Satellite Radio, Cellular Phone (850 MHz to 900 MHz and 1.8 GHz-1.9 GHz), any 2.4 GHz and UHF TV signals and light to harvest energy therefrom to charge an internal battery BT1 or other storage device for use on demand to power or recharge the batteries of an external electronic device 8 connected thereto. When not in use, the energy which is detected and harvested is stored in the battery BT1 or other storage device so that the battery or other storage device is fully charged and ready to power an external electronic device 8 when connected thereto by the user.

It should be further realized that the energy harvesting device or at least portions of the electrical circuit thereof may be incorporated directly into a cellular phone, PDA, camera, Blackberry™ device or other electronic device 8 to power the device or charge the batteries thereof, without using a stand alone energy harvesting device within a separate housing 32, such as shown in FIGS. 5-11. The antenna or antennas 2, and the solar cell 40, of the energy harvesting device may be mounted on or within the housing of the electronic device to receive transmitted RF signals and light energy, respectively, in order to power the electronic device 8 or charge the batteries thereof. It is also envisioned to be within the scope of the present invention to incorporate the electrical circuit of the energy harvesting device directly on or in the battery used to power the electronic device 8.

The various embodiments of the energy harvesting device of the present invention will now further be described in detail.

In one form of the present invention, an energy harvesting device preferably includes an antenna 2 for receiving a transmitted radio frequency (RF) signal, a rectifier circuit 6 operatively coupled to the antenna 2, the rectifier circuit 6 converting the RF signal received by the antenna 2 to a direct current (DC) voltage, and an output connector 30 operatively coupled to the rectifier circuit 6 and providing the DC voltage thereon, an electronic device 8 being connectable to the output connector 30 for receiving the DC voltage provided on the output connector 30.

In another form of the present invention, an energy harvesting device preferably includes an antenna 2 for receiving a transmitted radio frequency (RF) signal, the antenna 2 converting the received RF signal to an RF electrical signal, an RF-to-DC rectifier circuit 12, the RF-to-DC rectifier circuit 12 being operatively connected to the antenna 2 and converting the RF electrical signal to a direct current (DC) voltage, and a first storage device 14, the first storage device 14 being operatively connected to the RF-to-DC rectifier circuit 12 and being provided with the DC voltage and being charged thereby. The energy harvesting device preferably further includes a microcontroller 16, the microcontroller 16 having a first signal input operatively connected to the first storage device 14 to monitor the DC voltage on the first storage device 14, the microcontroller 16 generating a pulsed output signal if the DC voltage on the first storage device 14 is above a first pre-determined voltage level, a first stage DC-to-DC voltage converter circuit 20, the first stage DC-to-DC voltage converter circuit 20 being operatively connected to the first storage device 14 and generating an output DC voltage which is greater than the DC voltage on the first storage device 14, and a second stage DC-to-DC voltage converter circuit 22, the second stage DC-to-DC voltage converter circuit 22 being operatively connected to the first stage DC-to-DC voltage converter circuit 20 and generating an output DC voltage which is less than the output DC voltage generated by the first stage DC-to-DC voltage converter circuit 20. The energy harvesting device preferably further includes a second storage device 18, the second storage device 18 being operatively connected to the second stage DC-to-DC voltage converter circuit 22 and being provided with the output DC voltage generated by the second stage DC-to-DC voltage converter circuit 22 and being charged thereby, a third stage DC-to-DC voltage converter circuit 28, the third stage DC-to-DC voltage converter circuit 28 being operatively connected to the second storage device 18 and generating an output DC voltage which is greater than the DC voltage on the second storage device 18, and an output connector 30, the output connector 30 being operatively connected to the third stage DC-to-DC voltage converter circuit 28 and providing the output DC voltage generated by the third stage DC-to-DC voltage converter circuit 28 thereon. An electronic device 8 is connectable to the output connector 30 for receiving thereon the output DC voltage provided to the output connector 30.

The energy harvesting device described above may further include an input connector 24. The input connector 24 is operatively connected to the second stage DC-to-DC voltage converter circuit 22. An external source of DC voltage is connectable to the input connector 24 for providing the DC voltage from the external source to the second stage DC-to-DC voltage converter circuit 22. The second stage DC-to-DC voltage converter circuit 22 generates the output DC voltage of the second stage DC-to-DC voltage converter circuit 22 in response to the DC voltage from the external source provided on the input connector 24.

In a preferred form of the invention, the first storage device 14 of the energy harvesting device includes a capacitor. In a preferred form of the invention, the second storage device 18 of the energy harvesting device includes a battery.

Preferably, the microcontroller 16 includes a second signal input operatively connected to the second storage device 18 to monitor the DC voltage on the second storage device 18. The microcontroller 16 does not generate the pulsed output signal if the DC voltage on the second storage device 18 is above a second predetermined voltage level.

Another preferred form of the energy harvesting device is described as follows. The energy harvesting device includes a plurality of antennas 2 for receiving a transmitted radio frequency (RF) signal. The antennas 2 generate RF electrical signals in response to the transmitted RF signals received thereby. A plurality of multiplier and rectifier circuits 42 is also included. Each multiplier and rectifier circuit 42 is responsive to a respective RF electrical signal generated by an antenna 2 of the plurality of antennas and generates a direct current (DC) voltage in response thereto. At least some of the DC voltages are stacked in series to provide a combined DC voltage, the combined DC voltage being greater in magnitude than each individual DC voltage generated by a respective multiplier and rectifier circuit 42.

The energy harvesting device of this preferred embodiment further includes a temporary storage device 14. The temporary storage device 14 is responsive to the combined DC voltage and provides a temporarily stored DC voltage in response thereto. The temporary storage device 14 may be or include a capacitor. A first power management circuit 46 is also preferably included, the first power management circuit 46 being responsive to the temporarily stored DC voltage and generating a DC charging voltage in response thereto.

The energy harvesting device further preferably includes a main energy storage device 18. The main energy storage device 18 is responsive to the DC charging voltage generated by the first power management circuit 46 and provides a main energy storage DC voltage in response thereto. The main energy storage device 18 may be or include a battery, such as a lithium polymer battery. An output connector 30 is also preferably included in the device, the output connector 30 providing an output connector DC voltage thereon in response to the main energy storage DC voltage. An electronic device 8 is connectable to the output connector 30 for receiving thereon the output connector DC voltage provided on the output connector 30.

In another preferred form of the present invention, the energy harvesting device may further include a jump start DC voltage device 44. The jump start DC voltage device 44 provides a jump start DC voltage. The combined DC voltage includes the at least some of the DC voltages generated by the plurality of multiplier and rectifier circuits 42 stacked in series and the jump start DC voltage, if such a jump start DC voltage device 44 is included. The jump start DC voltage device 44 may be or include a battery.

An input connector 24 may be included in the energy harvesting device described above. The input connector 24 is connectable to a source of DC voltage external to the energy harvesting device, the DC voltage of the external source being provided to at least one of the main energy storage device 18, the jump start DC voltage device 44 and the output connector 30.

The energy harvesting device described above may also include a DC-to-DC voltage converter circuit 28. The DC-to-DC voltage converter circuit 28 is responsive to the main energy storage DC voltage and generates an output DC voltage in response thereto. The output connector 30 provides the output connector DC voltage in response to the output DC voltage generated by the DC-to-DC voltage converter circuit 28, if such is included.

The energy harvesting device also preferably includes a watchdog monitor circuit 50. The watchdog monitor circuit 50 is responsive to the temporarily stored DC voltage and selectively provides the temporarily stored DC voltage to the first power management circuit 46 if the temporarily stored DC voltage is greater than a predetermined voltage threshold.

In a more preferred form of the present invention, the energy harvesting device includes a solar cell circuit having a solar cell 40. The solar cell circuit receives light energy and generates a solar cell DC output voltage in response thereto. The solar cell DC output voltage is provided to at least one of the main energy storage device 18, the jump start DC voltage device 44 and the output connector 30. Furthermore, a second power management circuit 48 may be included for the solar cell circuit. The second power management circuit 48 is responsive to the solar cell DC output voltage and generates a managed solar cell DC output voltage in response thereto. The managed solar cell DC output voltage is provided to at least one of the main energy storage device 18, the jump start DC voltage device 44 and the output connector 30.

It should be noted that at least some of the DC voltages generated by the multiplier and rectifier circuits 42 may be coupled to provide group DC voltages, and the group DC voltages may be combined in parallel to define the combined DC voltage provided to the temporary storage device 14.

In a more specific form of the present invention, the plurality of antennas 2 of the energy harvesting device includes a first antenna 2a, a second antenna 2b, a third antenna 2c and a fourth antenna 2d, the first antenna 2a generating a first RF electrical signal, the second antenna 2b generating a second RF electrical signal, the third antenna 2c generating a third RF electrical signal, and the fourth antenna 2d generating a fourth RF electrical signal. Furthermore, the plurality of multiplier and rectifier circuits 42 of the energy harvesting device includes a first multiplier and rectifier circuit 42a, a second multiplier and rectifier circuit 42b, a third multiplier and rectifier circuit 42c and a fourth multiplier and rectifier circuit 42d, the first multiplier and rectifier circuit 42a being responsive to the first RF electrical signal generated by the first antenna 2a and generating a first multiplied and rectified DC voltage in response thereto, the second multiplier and rectifier circuit 42b being responsive to the second RF electrical signal generated by the second antenna 2b and generating a second multiplied and rectified DC voltage in response thereto, the third multiplier and rectifier circuit 42c being responsive to the third RF electrical signal generated by the third antenna 2c and generating a third multiplied and rectified DC voltage in response thereto, and the fourth multiplier and rectifier circuit 42d being responsive to the fourth RF electrical signal generated by the fourth antenna 2d and generating a fourth multiplied and rectified DC voltage in response thereto. The first multiplied and rectified DC voltage and the second multiplied and rectified DC voltage are preferably coupled in series to define a first group DC voltage. Similarly, the third multiplied and rectified DC voltage and the fourth multiplied and rectified DC voltage are preferably coupled in series to define a second group DC voltage. The first group DC voltage and the second group DC voltage are preferably combined in parallel to define the combined DC voltage which is provided to the temporary storage device 14.

Each antenna 2 of the plurality of antennas may have either a broadband bandwidth characteristic or a narrowband bandwidth characteristic, or the antennas 2 may be a mix of broadband and narrowband bandwidth characteristics.

The energy harvesting device of the present invention preferably includes a housing 32. The housing 32 has a base 36 defining an internal cavity for containing the electrical circuit of the energy harvesting device, and a cover 34 pivotally mounted on the base 36. The base 36 has a top surface 38, and the cover 34 is preferably pivotable between at least a closed position in which the cover 34 is in close proximity to the base 36 to at least partially cover the top surface 38, and an open position in which the cover 34 is substantially perpendicular to the top surface 38 of the base.

The plurality of antennas 2 is preferably mounted on the pivotable cover 34 of the housing 32 and are positionable in at least a first position in which the plurality of antennas 2 is in close proximity to the top surface 38 of the base 36 when the cover 34 is in the closed position, and a second position in which the plurality of antennas 2 is in a raised position from the top surface 38 of the base 36 when the cover 34 is in the open position.

If a solar cell circuit is included in the energy harvesting device, where the solar cell circuit includes a solar cell 40 for receiving light energy, the solar cell 40 is preferably mounted on the top surface 38 of the base 36 and is selectively covered and uncovered by the cover 34 when the cover 34 is respectively pivoted between the closed position and the open position. The cover 34 is preferably at least partially translucent to at least partially allow light energy to pass therethrough and to be received by the solar cell 40 when the cover 34 is in the closed position.

Alternatively, the energy harvesting device includes a housing 32 having a top surface 38, whereby the solar cell 40 is mounted on the top surface 38 of the housing. A cover need not be included. The housing 32 may include a base 36 defining an internal cavity for containing the electrical circuit of the energy harvesting device, the top surface 38 of the housing forming a portion of the base 36. Additionally, a non-pivotable cover 34 may be mounted on the base 36, the cover 34 at least partially covering the top surface 38 of the base 36 and the solar cell 40 mounted on the top surface 38. In this embodiment, it is preferred if the cover 34 is at least partially translucent to allow light energy to pass therethrough and impinge on the solar cell 40 situated below the cover 34.

Now, various forms of a method of harvesting energy in accordance with the present invention will further be described in detail.

In one form of the present invention, a method of harvesting energy includes the steps of receiving a transmitted radio frequency (RF) signal to provide a received RF signal, converting the received RF signal to an RF electrical signal, converting the RF electrical signal to a direct current (DC) voltage, temporarily storing the DC voltage to provide a temporarily stored DC voltage, monitoring the temporarily stored DC voltage and generating a pulsed output signal if the temporarily stored DC voltage is above a first predetermined voltage level, converting the temporarily stored DC voltage to a first converted DC voltage which is greater than the temporarily stored DC voltage, converting the first converted DC voltage to a second converted DC voltage which is less than the first converted DC voltage, storing the second converted DC voltage to provide a stored second converted DC voltage, converting the stored second converted DC voltage to a third converted DC voltage which is greater than the stored second converted DC voltage, and providing the third converted DC voltage to an output connector 30, an electronic device 8 being connectable to the output connector 30 for receiving thereon the third converted DC voltage provided to the output connector 30.

The method of harvesting energy described above may further include the step of connecting a source of external DC voltage to an input connector 24, the input connector 24 receiving the external DC voltage, the first converted DC voltage being at least partially defined by the external DC voltage.

Furthermore, the method of harvesting energy described above may further include the step of monitoring the stored second converted DC voltage and not generating the pulsed output signal if the stored second converted DC voltage is above a second predetermined voltage level.

In another form of the present invention, a method of harvesting energy includes the steps of receiving a transmitted radio frequency (RF) signal to provide a received RF signal, converting the received RF signal to a direct current (DC) voltage, and providing the DC voltage on an output connector 30, an electronic device 8 being connectable to the output connector 30 for receiving the DC voltage provided on the output connector 30.

In yet another form of the present invention, a method of harvesting energy includes the steps of receiving by a plurality of antennas 2 a transmitted radio frequency (RF) signal and generating RF electrical signals in response to the transmitted RF signals received by the plurality of antennas 2, multiplying and rectifying the RF electrical signals generated by the plurality of antennas 2 and generating a plurality of direct current (DC) voltages in response thereto, combining in series at least some of the DC voltages to provide a combined DC voltage, the combined DC voltage being greater in magnitude than each individual DC voltage, temporarily storing the combined DC voltage thereby providing a temporarily stored DC voltage, generating a DC charging voltage in response to the temporarily stored DC voltage, storing the DC charging voltage to provide a stored DC charging voltage, and generating a DC output connector voltage on an output connector 30 in response to the stored DC charging voltage, an electronic device 8 being connectable to the output connector 30 for receiving thereon the output connector DC voltage provided on the output connector 30.

Furthermore, the method of harvesting energy described above may further include the step of generating a jump start DC voltage, the combined DC voltage including the at least some of the DC voltages generated by the multiplying and rectifying step connected in series and the jump start DC voltage, and may further include the step of connecting an external DC voltage to an input connector 24, at least one of the stored DC charging voltage, the jump start DC voltage and the output connector DC voltage being defined at least partially by the external DC voltage.

Additionally, the method of harvesting energy described previously may include the step of converting the stored DC charging voltage to the output connector DC voltage provided on the output connector 30, and may include the further step of monitoring the temporarily stored DC voltage and selectively generating the DC charging voltage if the temporarily stored DC voltage is greater than a predetermined voltage threshold.

If a solar cell circuit is included in the energy harvesting device of the present invention, then the method of harvesting energy described above may include the step of receiving light energy by the solar cell circuit and generating a solar cell DC output voltage in response thereto, the at least one of the stored DC charging voltage, the output connector DC voltage provided on the output connector and the jump start DC voltage being defined at least partially by the solar cell DC output voltage.

The method of harvesting energy may further include the steps of coupling in series at least some of the DC voltages generated by the multiplying and rectifying step to provide group DC voltages, and combining the group DC voltages in parallel to define the combined DC voltage.

The method of harvesting energy may further include the step of adjustably positioning the plurality of antennas 2 between a first position and a second position, wherein the plurality of antennas 2 exhibits better signal reception characteristics to receive a transmitted RF signal when in the first position than when in the second position.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An energy harvesting device, which comprises:
at least one antenna for receiving a transmitted radio frequency (RF) signal, the at least one antenna converting the received RF signal to an RF electrical signal;
at least one RF-to-DC rectifier circuit, the at least one RF-to-DC rectifier circuit being operatively connected to the at least one antenna and converting the RF electrical signal to a direct current (DC) voltage;
a first storage device, the first storage device being operatively connected to the at least one RF-to-DC rectifier circuit and being provided with the DC voltage and being charged thereby;
a microcontroller, the microcontroller having a first signal input operatively connected to the first storage device to monitor the DC voltage on the first storage device, the microcontroller generating a pulsed output signal if the DC voltage on the first storage device is above a first pre-determined voltage level;
a first stage DC-to-DC voltage converter circuit, the first stage DC-to-DC voltage converter circuit being operatively connected to the first storage device and generating an output DC voltage which is greater than the DC voltage on the first storage device;
a second stage DC-to-DC voltage converter circuit, the second stage DC-to-DC voltage converter circuit being operatively connected to the first stage DC-to-DC voltage converter circuit and generating an output DC voltage which is less than the output DC voltage generated by the first stage DC-to-DC voltage converter circuit;
a second storage device, the second storage device being operatively connected to the second stage DC-to-DC voltage converter circuit and being provided with the output DC voltage generated by the second stage DC-to-DC voltage converter circuit and being charged thereby;
a third stage DC-to-DC voltage converter circuit, the third stage DC-to-DC voltage converter circuit being operatively connected to the second storage device and generating an output DC voltage which is greater than the DC voltage on the second storage device; and
an output connector, the output connector being operatively connected to the third stage DC-to-DC voltage converter circuit and providing the output DC voltage generated by the third stage DC-to-DC voltage converter circuit thereon, an electronic device being connectable to the output connector for receiving thereon the output DC voltage provided to the output connector.

2. An energy harvesting device as defined by claim 1, which further comprises:
an input connector, the input connector being operatively connected to the second stage DC-to-DC voltage converter circuit, the input connector being connectable to an external source of DC voltage for providing the DC voltage from the external source to the second stage DC-to-DC voltage converter circuit, the second stage DC-to-DC voltage converter circuit generating the output DC voltage of the second stage DC-to-DC voltage converter circuit in response to the DC voltage from the external source provided on the input connector.

3. An energy harvesting device as defined by claim 1, wherein the first storage device includes a capacitor.

4. An energy harvesting device as defined by claim 1, wherein the second storage device includes a battery.

5. An energy harvesting device as defined by claim 1, wherein the microcontroller includes a second signal input operatively connected to the second storage device to monitor the DC voltage on the second storage device, the microcontroller not generating the pulsed output signal if the DC voltage on the second storage device is above a second predetermined voltage level.

6. An energy harvesting device as defined by claim 1, which further comprises:
an input connector, the input connector being connectable to a source of DC voltage external to the energy harvesting device, the DC voltage of the external source being provided to at least one of the second storage device and the output connector.

7. An energy harvesting device as defined by claim 1, which further comprises:
a solar cell circuit, the solar cell circuit receiving light energy and generating a solar cell DC output voltage in response thereto, the solar cell DC output voltage being provided to at least one of the second storage device and the output connector.

8. An energy harvesting device as defined by claim 1, wherein the at least one antenna includes a plurality of antennas.

9. An energy harvesting device as defined by claim 8, wherein each antenna of the plurality of antennas has a broadband bandwidth characteristic.

10. An energy harvesting device as defined by claim 8, wherein each antenna of the plurality of antennas has a narrowband bandwidth characteristic.

11. An energy harvesting device as defined by claim 1, which further comprises:
a housing, the housing having a base defining an internal cavity, and a cover pivotally mounted on the base, the base having a top surface, the cover being pivotable between at least a closed position in which the cover is in close proximity to the base to at least partially cover the top surface, and an open position in which the cover is substantially perpendicular to the top surface of the base.

12. An energy harvesting device as defined by claim 11, wherein the at least one antenna is mounted on the pivotable cover of the housing and being positionable in at least a first position in which the at least one antenna is in close proximity to the top surface of the base when the cover is in the closed position, and a second position in which the at least one antenna is in a raised position from the top surface of the base when the cover is in the open position.

13. An energy harvesting device as defined by claim 11, which further comprises:

a solar cell circuit, the solar cell circuit including a solar cell for receiving light energy, the solar cell circuit generating a solar cell DC output voltage in response to the light energy received by the solar cell, the solar cell being mounted on the top surface of the base and selectively covered and uncovered by the cover when the cover is respectively pivoted between the closed position and the open position.

14. An energy harvesting device as defined by claim 1, which further comprises:

a solar cell circuit, the solar cell circuit including a solar cell for receiving light energy, the solar cell circuit generating a solar cell DC output voltage in response to the light energy received by the solar cell; and a housing, the housing having a top surface, the solar cell being mounted on the top surface of the housing.

15. An energy harvesting device as defined by claim 14, wherein the housing includes a base defining an internal cavity, and a cover mounted on the base, the top surface of the housing forming a portion of the base, the cover at least partially covering the top surface of the base and the solar cell mounted on the top surface.

16. An energy harvesting device as defined by claim 15, wherein the cover is at least partially translucent to at least partially allow light energy to pass therethrough and to be received by the solar cell.

17. An energy harvesting device as defined by claim 12, wherein the cover is at least partially translucent to at least partially allow light energy to pass therethrough and to be received by the solar cell when the cover is in the closed position.

18. An energy harvesting device, which comprises:

a plurality of antennas for receiving a transmitted radio frequency (RF) signal, the antennas generating RF electrical signals in response to the transmitted RF signals received thereby;

a plurality of multiplier and rectifier circuits, each multiplier and rectifier circuit being responsive to a respective RF electrical signal generated by an antenna of the plurality of antennas and generating a direct current (DC) voltage in response thereto, at least some of the DC voltages being stacked in series to provide a combined DC voltage, the combined DC voltage being greater in magnitude than each individual DC voltage generated by a respective multiplier and rectifier circuit;

a temporary storage device, the temporary storage device being responsive to the combined DC voltage and providing a temporarily stored DC voltage in response thereto;

a first power management circuit, the first power management circuit being responsive to the temporarily stored DC voltage and generating a DC charging voltage in response thereto;

a main energy storage device, the main energy storage device being responsive to the DC charging voltage generated by the first power management circuit and providing a main energy storage DC voltage in response thereto; and an output connector, the output connector providing an output connector DC voltage thereon in response to the main energy storage DC voltage, an electronic device being connectable to the output connector for receiving thereon the output connector DC voltage provided on the output connector, wherein at least some of the DC voltages generated by the multiplier and rectifier circuits are coupled in series to provide group DC voltages, and wherein the group DC voltages are combined in parallel to define the combined DC voltage;

wherein the plurality of antennas includes a first antenna, a second antenna, a third antenna and a fourth antenna, the first antenna generating a first RF electrical signal, the second antenna generating a second RF electrical signal, the third antenna generating a third RF electrical signal, the fourth antenna generating a fourth RF electrical signal;

wherein the plurality of multiplier and rectifier circuits includes a first multiplier and rectifier circuit, a second multiplier and rectifier circuit, a third multiplier and rectifier circuit and a fourth multiplier and rectifier circuit, the first multiplier and rectifier circuit being responsive to the first RF electrical signal generated by the first antenna and generating a first multiplied and rectified DC voltage in response thereto, the second multiplier and rectifier circuit being responsive to the second RF electrical signal generated by the second antenna and generating a second multiplied and rectified DC voltage in response thereto, the third multiplier and rectifier circuit being responsive to the third RF electrical signal generated by the third antenna and generating a third multiplied and rectified DC voltage in response thereto, the fourth multiplier and rectifier circuit being responsive to the fourth RF electrical signal generated by the fourth antenna and generating a fourth multiplied and rectified DC voltage in response thereto;

wherein the first multiplied and rectified DC voltage and the second multiplied and rectified DC voltage are coupled in series to define a first group DC voltage;

wherein the third multiplied and rectified DC voltage and the fourth multiplied and rectified DC voltage are coupled in series to define a second group DC voltage;

and wherein the first group DC voltage and the second group DC voltage are combined in parallel to define the combined DC voltage.

19. An energy harvesting device as defined by claim 18, which further comprises:

a jump start DC voltage device, the jump start DC voltage device providing a jump start DC voltage, the combined DC voltage including the at least some of the DC voltages generated by the plurality of multiplier and rectifier circuits stacked in series and the jump start DC voltage.

20. An energy harvesting device as defined by claim 18, which further comprises:

an input connector, the input connector being connectable to a source of DC voltage external to the energy harvesting device, the DC voltage of the external source being provided to at least one of the main energy storage device and the output connector.

21. An energy harvesting device as defined by claim 18, which further comprises:

a DC-to-DC voltage converter circuit, the DC-to-DC voltage converter circuit being responsive to the main energy storage DC voltage and generating an output DC voltage in response thereto, the output connector providing the output connector DC voltage in response to the output DC voltage generated by the DC-to-DC voltage converter circuit.

22. An energy harvesting device as defined by claim 18, which further comprises:

a watchdog monitor circuit, the watchdog monitor circuit being responsive to the temporarily stored DC voltage and selectively providing the temporarily stored DC voltage to the first power management circuit if the temporarily stored DC voltage is greater than a predetermined voltage threshold.

23. An energy harvesting device as defined by claim 18, which further comprises:
a solar cell circuit, the solar cell circuit receiving light energy and generating a solar cell DC output voltage in response thereto, the solar cell DC output voltage being provided to at least one of the main energy storage device and the output connector.

24. An energy harvesting device as defined by claim 19, which further comprises:
a solar cell circuit, the solar cell circuit receiving light energy and generating a solar cell DC output voltage in response thereto, the solar cell DC output voltage being provided to at least one of the main energy storage device, the output connector and the jump start DC voltage device.

25. An energy harvesting device as defined by claim 18, which further comprises:
a solar cell circuit, the solar cell circuit receiving light energy and generating a solar cell DC output voltage in response thereto; and
a second power management circuit, the second power management circuit being responsive to the solar cell DC output voltage and generating a managed solar cell DC output voltage in response thereto, the managed solar cell DC output voltage being provided to at least one of the main energy storage device and the output connector.

26. An energy harvesting device as defined by claim 19, which further comprises:
a solar cell circuit, the solar cell circuit receiving light energy and generating a solar cell DC output voltage in response thereto; and
a second power management circuit, the second power management circuit being responsive to the solar cell DC output voltage and generating a managed solar cell DC output voltage in response thereto, the managed solar cell DC output voltage being provided to at least one of the main energy storage device, the output connector and the jump start DC voltage device.

27. An energy harvesting device as defined by claim 18, wherein each antenna of the plurality of antennas has a broadband bandwidth characteristic.

28. An energy harvesting device as defined by claim 18, wherein each antenna of the plurality of antennas has a narrowband bandwidth characteristic.

29. An energy harvesting device as defined by claim 18, which further comprises:
a housing, the housing having a base defining an internal cavity, and a cover pivotally mounted on the base, the base having a top surface, the cover being pivotable between at least a closed position in which the cover is in close proximity to the base to at least partially cover the top surface, and an open position in which the cover is substantially perpendicular to the top surface of the base.

30. An energy harvesting device as defined by claim 29, wherein the plurality of antennas is mounted on the pivotable cover of the housing and being positionable in at least a first position in which the plurality of antennas is in close proximity to the top surface of the base when the cover is in the closed position, and a second position in which the plurality of antennas is in a raised position from the top surface of the base when the cover is in the open position.

31. An energy harvesting device as defined by claim 29, which further comprises:
a solar cell circuit, the solar cell circuit including a solar cell for receiving light energy, the solar cell circuit generating a solar cell DC output voltage in response to the light energy received by the solar cell, the solar cell being mounted on the top surface of the base and selectively covered and uncovered by the cover when the cover is respectively pivoted between the closed position and the open position.

32. An energy harvesting device as defined by claim 18, which further comprises:
a solar cell circuit, the solar cell circuit including a solar cell for receiving light energy, the solar cell circuit generating a solar cell DC output voltage in response to the light energy received by the solar cell; and
a housing, the housing having a top surface, the solar cell being mounted on the top surface of the housing.

33. An energy harvesting device as defined by claim 32, wherein the housing includes a base defining an internal cavity, and a cover mounted on the base, the top surface of the housing forming a portion of the base, the cover at least partially covering the top surface of the base and the solar cell mounted on the top surface.

34. An energy harvesting device as defined by claim 33, wherein the cover is at least partially translucent to at least partially allow light energy to pass therethrough and to be received by the solar cell.

35. An energy harvesting device as defined by claim 30, wherein the cover is at least partially translucent to at least partially allow light energy to pass therethrough and to be received by the solar cell when the cover is in the closed position.

36. An energy harvesting device as defined by claim 18, wherein the temporary storage device includes a capacitor.

37. An energy harvesting device as defined by claim 18, wherein the main energy storage device includes a battery.

38. An energy harvesting device as defined by claim 19, wherein the jump start DC voltage device includes a battery.

39. A method of harvesting energy, which comprises the steps of:
receiving a transmitted radio frequency (RF) signal to provide a received RF signal;
converting the received RF signal to an RF electrical signal;
converting the RF electrical signal to a direct current (DC) voltage;
temporarily storing the DC voltage to provide a temporarily stored DC voltage;
monitoring the temporarily stored DC voltage and generating a pulsed output signal if the temporarily stored DC voltage is above a first predetermined voltage level;
converting the temporarily stored DC voltage to a first converted DC voltage which is greater than the temporarily stored DC voltage;
converting the first converted DC voltage to a second converted DC voltage which is less than the first converted DC voltage;
storing the second converted DC voltage to provide a stored second converted DC voltage;
converting the stored second converted DC voltage to a third converted DC voltage which is greater than the stored second converted DC voltage; and
providing the third converted DC voltage to an output connector, an electronic device being connectable to the output connector for receiving thereon the third converted DC voltage provided to the output connector.

40. A method of harvesting energy as defined by claim 39, which further comprises the step of:
connecting a source of external DC voltage to an input connector, the input connector receiving the external DC voltage, the first converted DC voltage being at least partially defined by the external DC voltage.

41. A method of harvesting energy as defined by claim 39, wherein the step of temporarily storing the DC voltage is at least partially performed by using a capacitor.

42. A method of harvesting energy as defined by claim 39, wherein the step of storing the second converted DC voltage is at least partially performed by using a battery.

43. A method of harvesting energy as defined by claim 39, which further comprises the step of:
monitoring the stored second converted DC voltage and not generating the pulsed output signal if the stored second converted DC voltage is above a second predetermined voltage level.

44. A method of harvesting energy, which comprises the steps of:
receiving by a plurality of antennas a transmitted radio frequency (RF) signal and generating RF electrical signals in response to the transmitted RF signals received by the plurality of antennas;
multiplying and rectifying the RF electrical signals generated by the plurality of antennas and generating a plurality of direct current (DC) voltages in response thereto;
combining in series at least some of the DC voltages to provide a combined DC voltage, the combined DC voltage being greater in magnitude than each individual DC voltage;
temporarily storing the combined DC voltage thereby providing a temporarily stored DC voltage;
monitoring the temporarily stored DC voltage and generating a pulsed output signal if the temporarily stored DC voltage is above a first predetermined voltage level;
converting the temporarily stored DC voltage to a first converted DC voltage which is greater than the temporarily stored DC voltage;
converting the first converted DC voltage to a second converted DC voltage which is less than the first converted DC voltage;
storing the second converted DC voltage to provide a stored second converted DC voltage;
converting the stored second converted DC voltage to a third converted DC voltage which is greater than the stored second converted DC voltage; and
providing the third converted DC voltage to an output connector, an electronic device being connectable to the output connector for receiving thereon the third converted DC voltage provided to the output connector.

45. A method of harvesting energy as defined by claim 44, which further comprises the step of:
generating a jump start DC voltage, the combined DC voltage including the at least some of the DC voltages generated by the multiplying and rectifying step connected in series and the jump start DC voltage.

46. A method of harvesting energy as defined by claim 44, which further comprises the step of:
connecting an external DC voltage to an input connector, at least one of the stored DC charging voltage and the output connector DC voltage being defined at least partially by the external DC voltage.

47. A method of harvesting energy as defined by claim 44, which further comprises the step of:
converting the stored DC charging voltage to the output connector DC voltage provided on the output connector.

48. A method of harvesting energy as defined by claim 44, which further comprises the step of:
monitoring the temporarily stored DC voltage and selectively generating the DC charging voltage if the temporarily stored DC voltage is greater than a predetermined voltage threshold.

49. A method of harvesting energy as defined by claim 44, which further comprises the step of:
receiving light energy by a solar cell circuit and generating a solar cell DC output voltage in response thereto, at least one of the stored DC charging voltage and the output connector DC voltage provided on the output connector being defined at least partially by the solar cell DC output voltage.

50. A method of harvesting energy as defined by claim 45, which further comprises the step of:
receiving light energy by a solar cell circuit and generating a solar cell DC output voltage in response thereto, the at least one of the stored DC charging voltage, the output connector DC voltage provided on the output connector and the jump start DC voltage being defined at least partially by the solar cell DC output voltage.

51. A method of harvesting energy as defined by claim 44, which further comprises the steps of:
coupling in series at least some of the DC voltages generated by the multiplying and rectifying step to provide group DC voltages; and
combining the group DC voltages in parallel to define the combined DC voltage.

52. A method of harvesting energy as defined by claim 44, wherein each antenna of the plurality of antennas has a broadband bandwidth characteristic.

53. A method of harvesting energy as defined by claim 44, wherein each antenna of the plurality of antennas has a narrowband bandwidth characteristic.

54. A method of harvesting energy as defined by claim 44, which further comprises the steps of:
adjustably positioning the plurality of antennas between a first position and a second position, wherein the plurality of antennas exhibits better signal reception characteristics to receive a transmitted RF signal when in the first position than when in the second position.

55. A method of harvesting energy as defined by claim 49, which further comprises the step of:
mounting the plurality of antennas and at least a portion of the solar cell circuit to a housing, the housing having a base defining an internal cavity, and a cover pivotally mounted on the base, the base having a top surface, the cover being pivotable between at least a closed position in which the cover is in close proximity to the base to at least partially cover the top surface, and an open position in which the cover is substantially perpendicular to the top surface of the base, the plurality of antennas being mounted on the pivotable cover of the housing and being positionable in at least a first position in which the plurality of antennas is in close proximity to the top surface of the base when the cover is in the closed position, and a second position in which the plurality of antennas is in a raised position from the top surface of the base when the cover is in the open position, the at least portion of the solar cell circuit being mounted on the top surface of the base and selectively covered and uncovered by the cover when the cover is respectively pivoted between the closed position and the open position.

56. A method of harvesting energy as defined by claim 55, wherein the cover is at least partially translucent to at least partially allow light energy to pass therethrough and to be received by the at least portion of the solar cell circuit.

57. A method of harvesting energy as defined by claim 44, wherein the step of temporarily storing the combined DC voltage is at least partially performed by using a capacitor.

58. A method of harvesting energy as defined by claim 44, wherein the step of storing the DC charging voltage is at least partially performed by using a battery.

59. A method of harvesting energy as defined by claim 45, wherein the step of generating a jump start DC voltage is at least partially performed by using a battery.

* * * * *